United States Patent [19]

Inaba et al.

[11] Patent Number: 5,389,954
[45] Date of Patent: Feb. 14, 1995

[54] LASER PROCESS APPARATUS FOR FORMING HOLES IN A WORKPIECE

[75] Inventors: Masaki Inaba, Kawasaki; Hiroshi Kohno, Yokohama; Fumio Ichikawa, Kamakura; Kazuaki Masuda, Kawasaki; Takashi Watanabe, Yokohama; Tsuyoshi Orikasa, Kasukabe; Masayuki Nishiwaki, Kawasaki; Toshio Tsuda; Akira Goto, both of Yokohama, all of Japan

[73] Assignee: Canon Kabushiki Kaisha, Tokyo, Japan

[21] Appl. No.: 794,862

[22] Filed: Nov. 19, 1991

[30] Foreign Application Priority Data

| Nov. 21, 1990 | [JP] | Japan | 2-314135 |
| Nov. 21, 1990 | [JP] | Japan | 2-314136 |
| Nov. 22, 1990 | [JP] | Japan | 2-315925 |
| Nov. 30, 1990 | [JP] | Japan | 2-329524 |
| May 13, 1991 | [JP] | Japan | 3-135324 |

[51] Int. Cl.⁶ .................................. B41J 2/435
[52] U.S. Cl. .................................. 347/258
[58] Field of Search ........... 346/1.1, 76 L, 108, 346/168; 358/296, 308, 367

[56] References Cited

U.S. PATENT DOCUMENTS

| 3,677,465 | 7/1972 | Johnson et al. | 346/76 L |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,758,703 | 7/1988 | Drever et al. | 219/121.68 |
| 4,952,945 | 8/1990 | Hikima | 346/108 |
| 4,997,250 | 3/1991 | Ortiz, Jr. | 350/96.18 |
| 5,029,964 | 7/1991 | Edwards et al. | 350/96.18 |
| 5,208,818 | 3/1993 | Gelbart et al. | 346/108 |

FOREIGN PATENT DOCUMENTS

| 309146 | 3/1989 | European Pat. Off. |
| 55-055890 | 4/1980 | Japan |
| 57-202992 | 12/1982 | Japan |
| 59-123670 | 7/1984 | Japan |
| 59-138461 | 8/1984 | Japan |
| 63-81882 | 4/1988 | Japan |
| 1-294047 | 11/1989 | Japan |

OTHER PUBLICATIONS

"Multiple-Reflection and Focussing Apparatus for Concentrating Laser Radiation at an Array of Sites", IBM Technical Disclosure Bulletin, vol. 33, No. 2, pp. 169-174 (Jul. 1990).

Primary Examiner—Mark J. Reinhart
Attorney, Agent, or Firm—Fitzpatrick, Cella, Harper & Scinto

[57] ABSTRACT

In a laser process apparatus, a plurality of holes each having a predetermined shape are formed in a work upon radiation of light from an excimer laser. The apparatus is provided with a mask, in which a plurality of predetermined small holes are formed in correspondence with the plurality of holes to be formed in the work, and which allows laser light from the excimer laser to pass through the small holes thereof toward the work, a projection optical system for projecting optical images each having a predetermined shape onto the work through the small holes of the mask, a measurement optical system for measuring a work position, and a moving stage for moving the work on the basis of a measurement result form the measurement optical system.

32 Claims, 36 Drawing Sheets

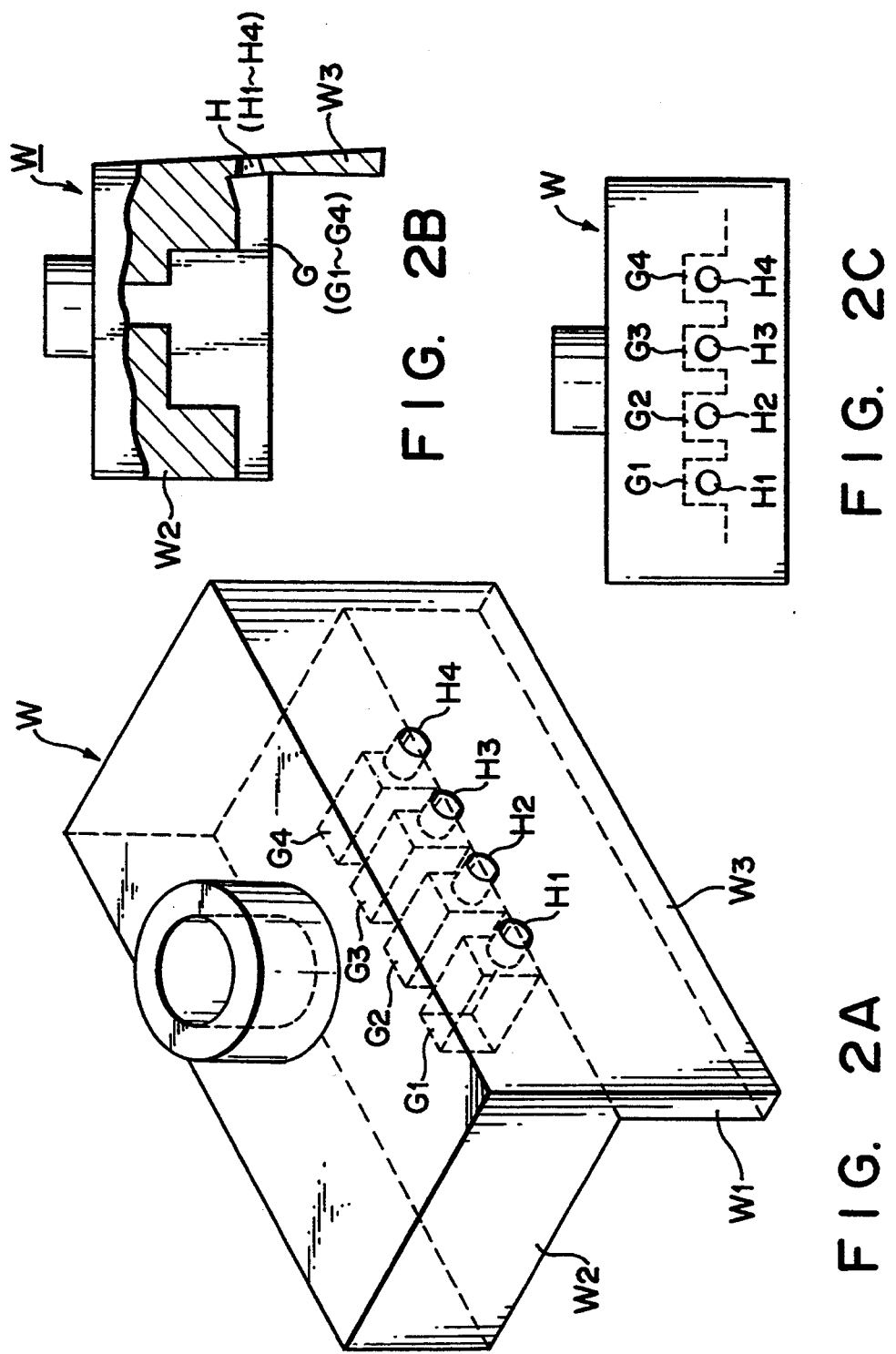

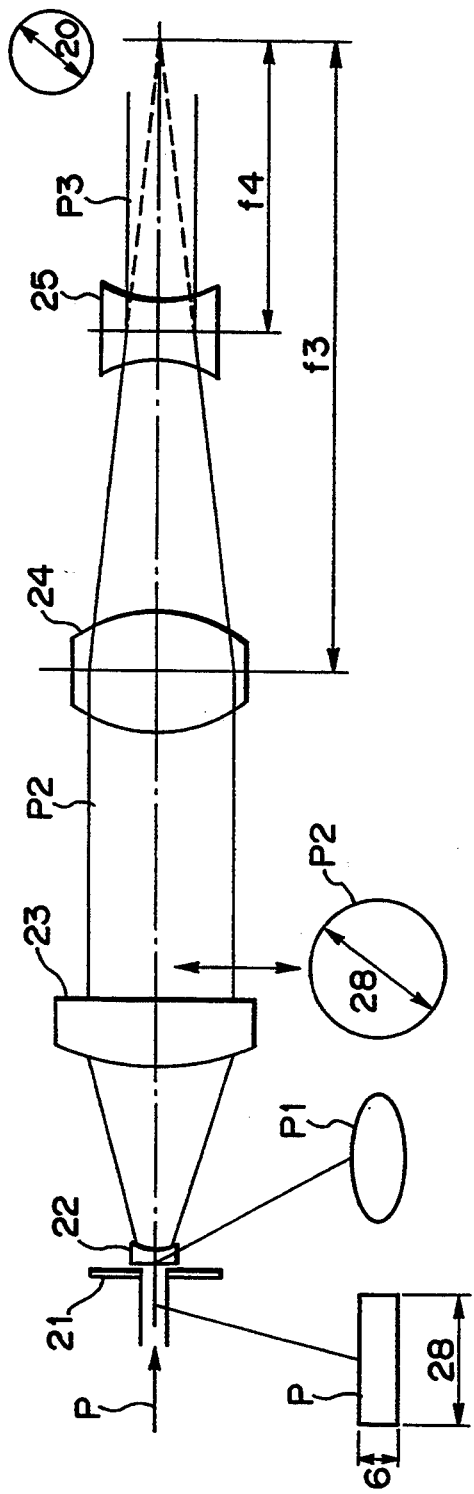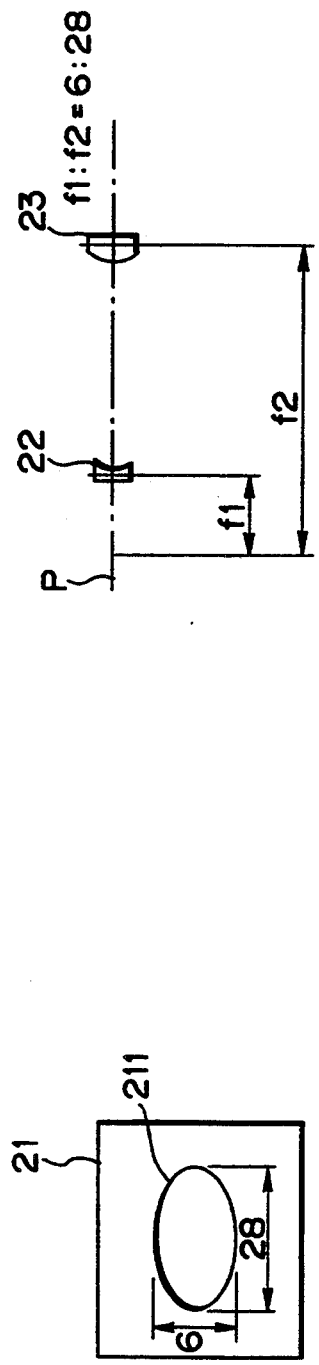
FIG. 3A
FIG. 3B
FIG. 3C

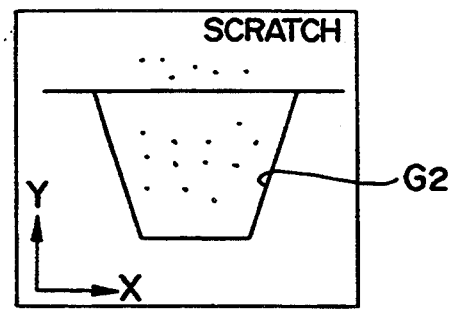
FIG. 15A
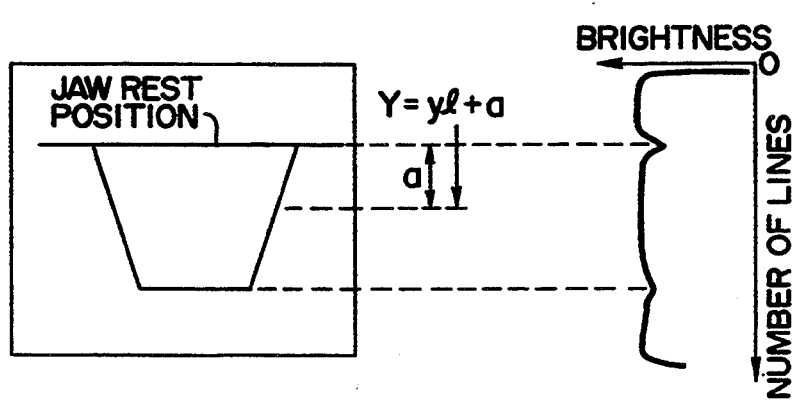
FIG. 15B
FIG. 15D
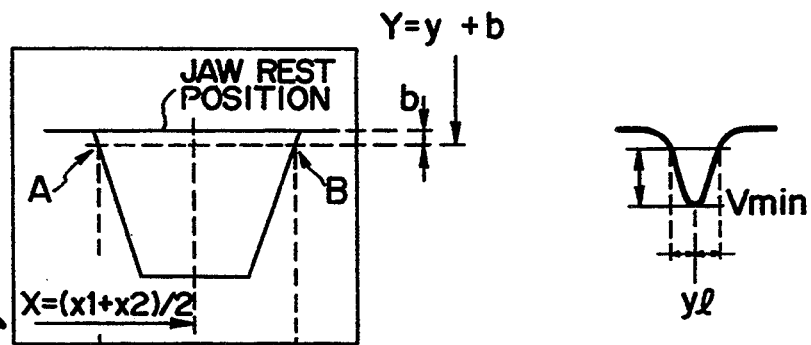
FIG. 15C
FIG. 15E
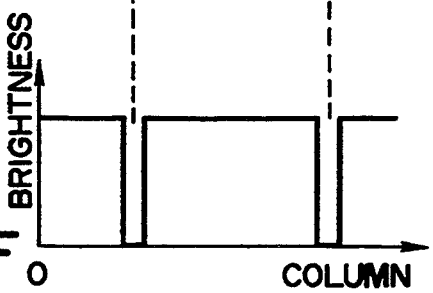
FIG. 15F
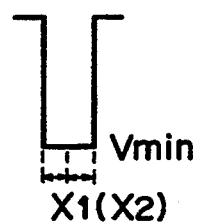
FIG. 15G

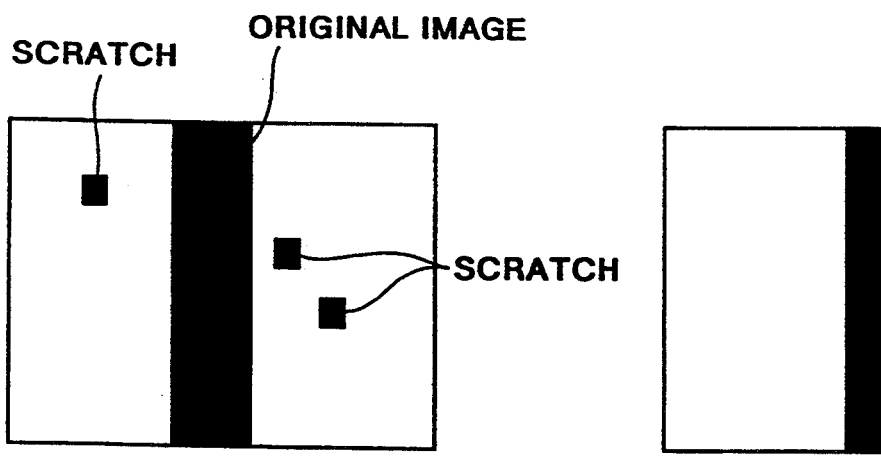
FIG. 16A
FIG. 16B
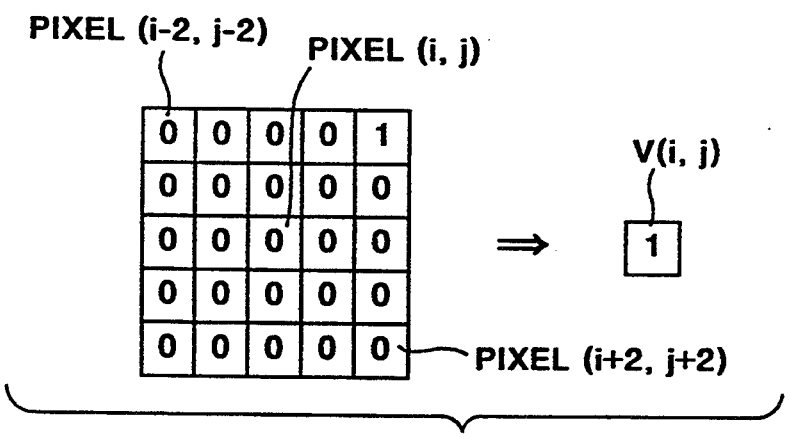
FIG. 16C
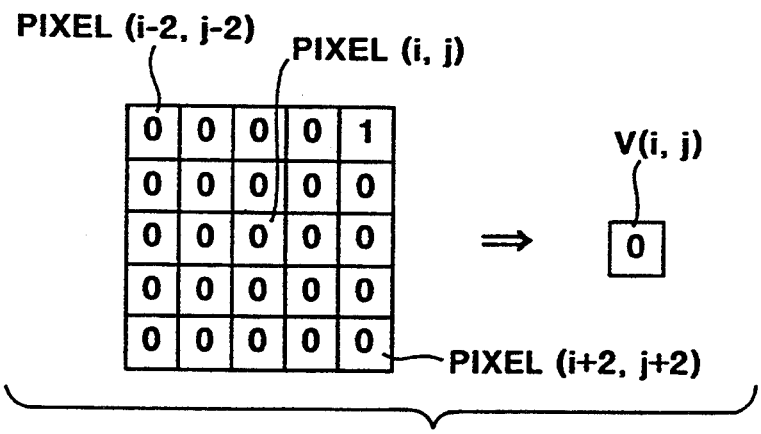
FIG. 16D

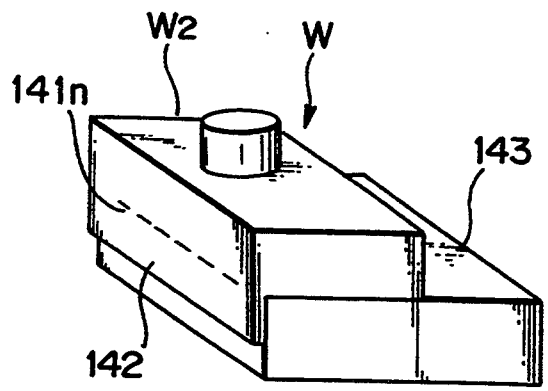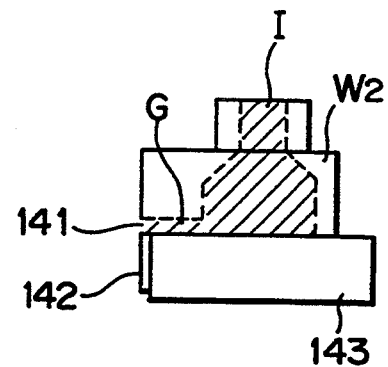
FIG. 19A    FIG. 19B
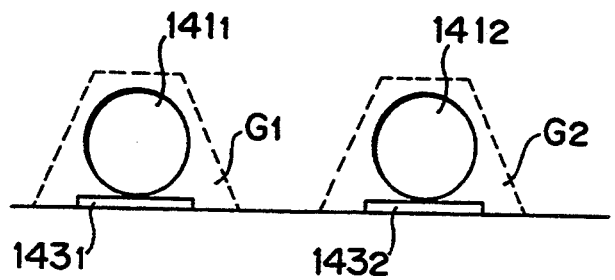
FIG. 20A
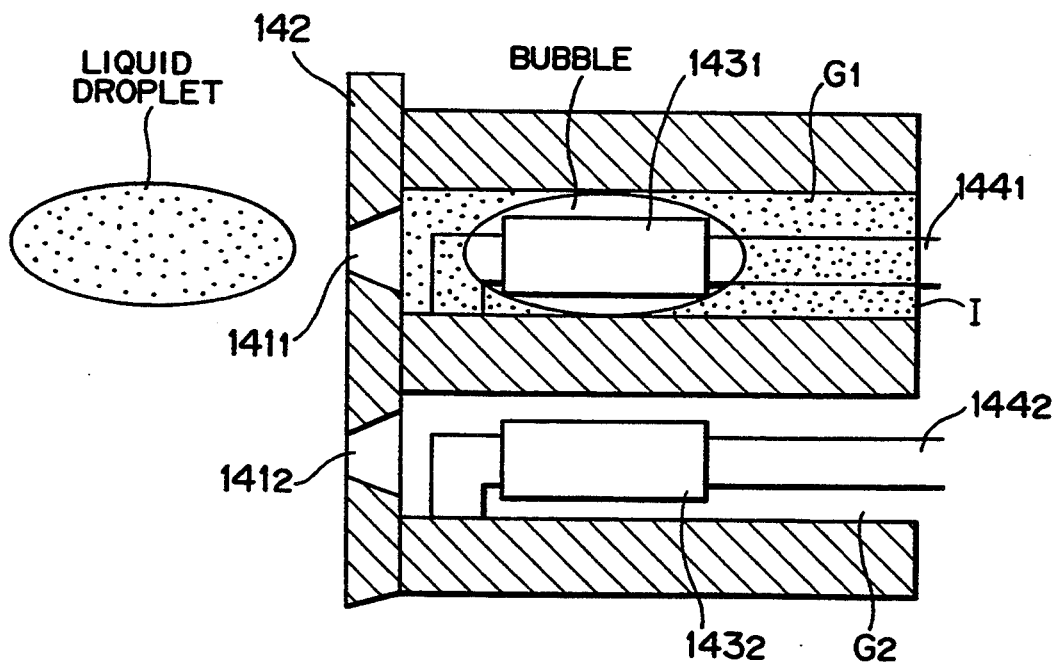
FIG. 20B

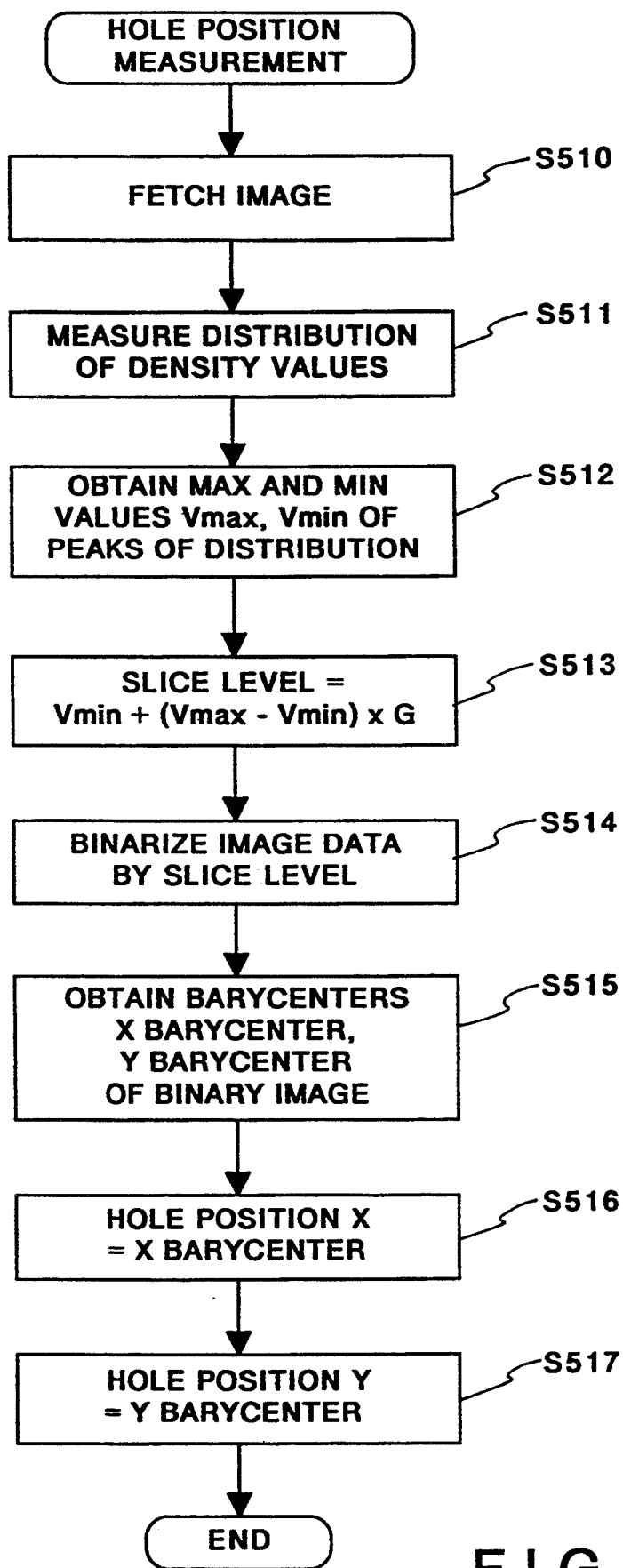
F I G. 21

LASER LIGHT

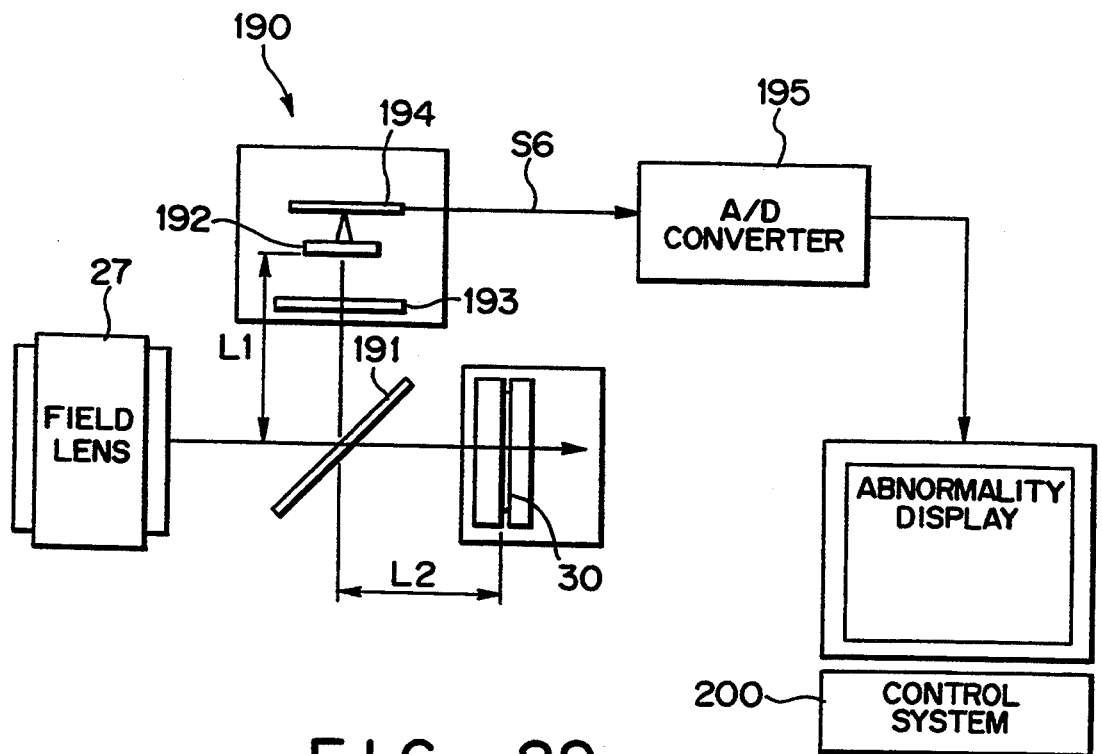
F I G. 29
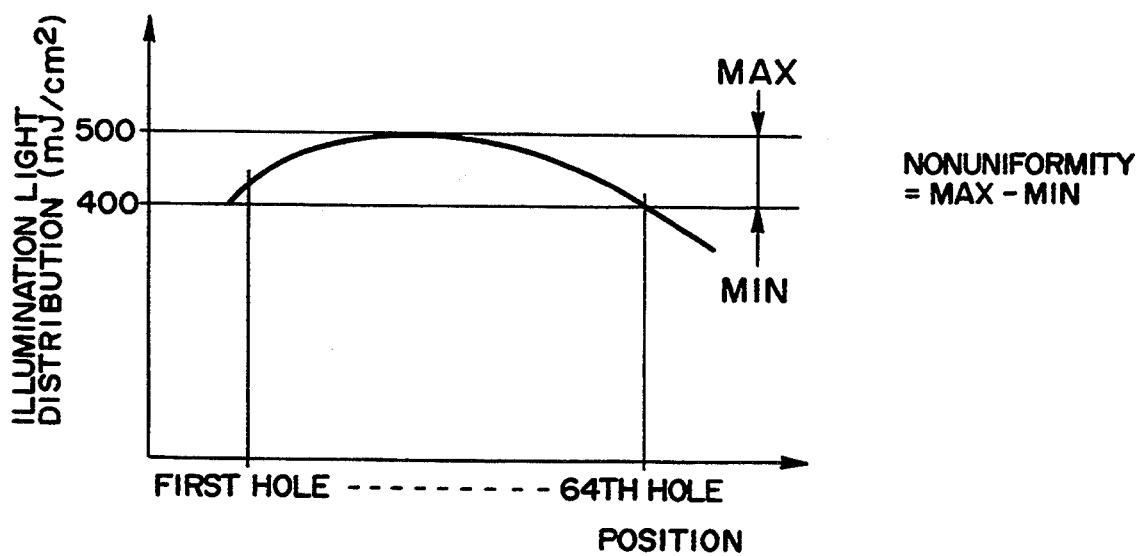
F I G. 30

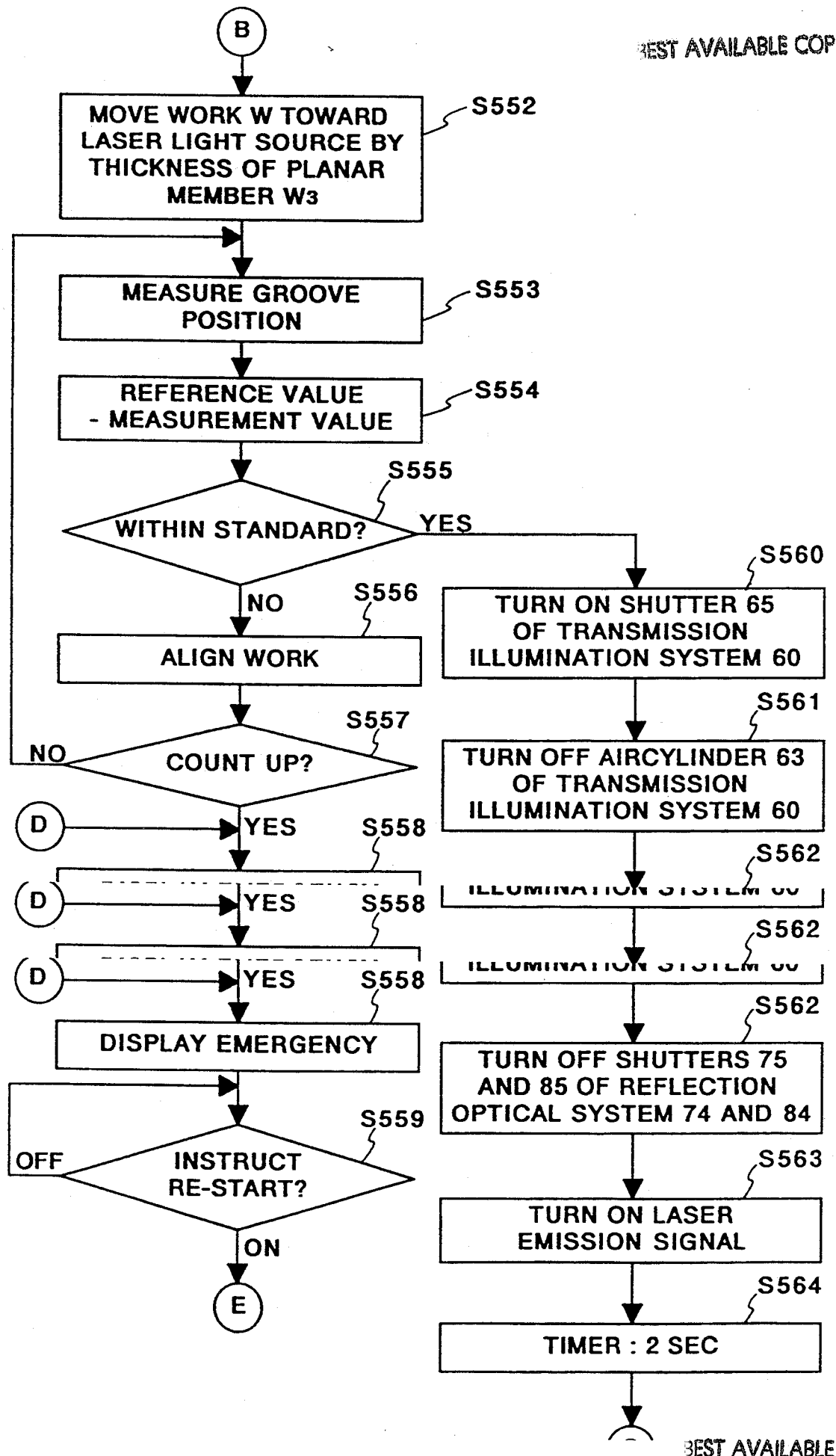

LASER PROCESS APPARATUS FOR FORMING HOLES IN A WORKPIECE

BACKGROUND OF THE INVENTION

The present invention relates to a laser process machine suitable for a hole forming machine using a laser, which machine is developed for mainly processing ink discharge orifices in an ink-jet head.

Holes having a predetermined shape and size are formed in a work, or workpiece using a laser beam in consideration of high process precision of the laser beam. In particular, the process precision of ink discharge orifices of an ink-jet head used in a printer, connected to a computer or a wordprocessor, for printing (recording) data by discharging an ink in a predetermined pattern directly influences an ink discharge amount, a discharge direction, and the like. For this reason, the holes must be processed very carefully.

The above-mentioned ink-jet head is employed especially in a bubble-jet type recording head for discharging an ink by utilizing heat energy, of ink-jet recording methods. A typical arrangement and principle of a bubble-jet type recording apparatus are disclosed in, e.g., U.S. Pat. Nos. 4,723,129, 4,740,796, and the like, and can be applied to either of a so-called on-demand type or continuous type An on-demand type bubble-jet recording method will be exemplified below. Electro-thermal converters are arranged in correspondence with a sheet or a liquid channel, which holds a liquid (ink), and are caused to generate heat energy according to drive signals, thus causing film boiling on a heat application surface of a recording head. Consequently, bubbles having a one-to-one correspondence with the drive signals are formed in the liquid (ink), and the liquid (ink) is discharged in the form of liquid droplets from discharge orifices by growth and contraction of the bubbles.

The drive signal to be applied is preferably a pulse signal, as disclosed in U.S. Pat. Nos. 4,463,359 and 4,345,262. As for a temperature rise rate of the heat application surface, conditions disclosed in U.S. Pat. No. 4,313,124 are preferably employed.

The ink-jet head is constituted by a combination of discharge orifices, a liquid channel (a linear liquid channel or a right-angled liquid channel), and electro-thermal converters. In addition to this arrangement, a heat application portion may be arranged on a bent region, as disclosed in, e.g., U.S. Pat. Nos. 4,558,333 and 4,459,600. Furthermore, the ink-jet head may be arranged as follows. That is, a slit common to a plurality of electro-thermal converters may be used as a discharge portion of the electro-thermal converters, as disclosed in, e.g., Japanese Patent Laid-Open No. 59-123670, or holes for absorbing output waves of heat energy may be formed in correspondence with a discharge portion, as disclosed in, e.g., Japanese Patent Laid-Open No. 59-138461. Note that each recording head described in the above-mentioned specifications assures a length corresponding to a predetermined width by combining a plurality of recording heads. However, a single recording head may have a length corresponding to the predetermined width (the width of a maximum recording medium, which can be used in recording of a recording apparatus).

The ink-jet head may be arranged as a chip type head, which is attached to an apparatus main body to attain electrical connections (for electro-thermal converters), and to be able to be supplied with an ink, or as a cartridge type head provided to a recording head itself.

As a process method of forming the ink-jet head, which can be used in various forms, a laser process apparatus for radiating laser light onto a work through a mask formed with holes each having a predetermined shape is proposed. With this apparatus, laser light is radiated on a mask formed with a plurality of arrays of holes so as to project laser beam spots similar to the holes formed in this mask onto a work to be processed, thereby forming holes in the work.

This mask is arranged to be able to finely adjust its positions in the height and lateral directions, so that laser light to be radiated includes all the holes of the mask. The position adjustment is manually performed, and the adjustment result is visually confirmed. The laser light intensity varies depending on radiation positions. For this reason, even when laser light is radiated through holes having the same shape, holes formed in the work undesirably have different shapes depending on the beam radiation positions. Therefore, the position adjustment of the mask is performed by actually processing a work, and confirming the states of formed holes.

However, the above-mentioned conventional laser process apparatus suffers from the following problems, and its improvement is desired.

(1) When laser light is focused at one point to form a hole one by one, a very long time is required for processing a work, which requires formation of a large number of holes, resulting in poor work efficiency.

(2) Especially, a very long time is spent to set accurate hole formation positions on a work, thus considerably impairing the work efficiency.

(3) The size of each hole is largely influenced by laser light intensity. Since laser light emitted from an excimer laser has a nonuniform energy distribution, when a plurality of holes are simultaneously formed by projecting a plurality of laser beams which are divided from a laser light emitted from a laser source whereby the laser light is radiated on the mask on which a plurality of holes are formed, the holes cannot have a uniform size. As a result, holes having a desired shape cannot be formed.

(4) In order to form a hole having a large hole area without changing the materials and shapes of a mask and a work, the energy density of laser light to be radiated on a work W must be increased.

In recent years, very high precision, i.e., precision on the order of microns, is required in a laser process. According to this requirement, very small holes must be formed in a mask. As a result, a work and a mask must be precisely aligned with each other.

The mask must be exchanged when a work shape is altered or when the mask itself is deteriorated. When the mask is exchanged, aligning operations between a work and a mask are performed. These aligning operations are performed as follows. That is, a work as a dummy is processed, and the shape of the processed portion is photographed using an industrial television. A measurement value of a predetermined portion obtained based on image information as the photographing result is compared with a predetermined setting value.

For this reason, the following problems are pointed out.

(5) In a conventional laser process apparatus, when a mask is exchanged, a work is actually processed, and the mask position is checked based on the shape of the processed hole. For this reason, the adjustment of the mask position requires much time, resulting in poor productivity.

(6) A mask is aligned using image information obtained using the industrial television. However, since the industrial television has a very narrow field angle, much time is required to bring a processed portion within an image region. As a result, a very long time is required for the manufacture, which leads to an increase in manufacturing cost.

In the above-mentioned laser hole forming process machine, a mask, which is formed of, e.g., Ni, and comprises a mask pattern for converting laser light emitted from a laser light source into light beams corresponding to holes to be formed, is fixed to a mask holder arranged on the laser optical axis between the laser light source and a work in which holes are to be formed. The light beams passing through the mask pattern of the mask are radiated on a process surface of a work to form holes.

In this laser hole forming process machine, light passing through the mask pattern is 1% or less of the entire laser light, and most laser light is reflected or absorbed by the mask. As a result, the absorbed laser light is converted to heat, and the heat causes a temperature rise of the mask. For this reason, the mask holder is attached to an apparatus frame, and the temperature rise of the mask is suppressed by natural cooling.

However, since the temperature rise of the mask is suppressed by natural cooling in this manner, the following problems are posed.

(7) When the atmospheric temperature (i.e., room temperature) around the mask is increased, the mask temperature is undesirably increased.

(8) When the temperature rise occurs due to laser light radiation, the cooling effect of the mask cannot be expected. As a result, the mask is expanded, and the mask pattern is deteriorated, thus impairing process precision.

For example, assume that Ni is used as a mask material, as described above. The linear expansion coefficient of Ni is $1.3 \times 10^{-5}$. In order to suppress the pitch precision of processed holes within a range of $\pm 1$ $\mu$m/8.2 mm, a change in temperature of the mask must be controlled to fall within a range of $\pm 10$ degrees. However, in consideration of a change in room temperature, and the temperature rise caused by radiation of a laser beam, it is difficult to control a change in temperature of the mask to fall within a range of $\pm 10$ degrees by natural cooling.

SUMMARY OF THE INVENTION

The present invention has been made in consideration of the above-mentioned problems, and has as its first object to provide a laser process apparatus, which can simultaneously form a desired number of uniform holes in a work.

It is the second object of the present invention to provide a hole formation process position aligning method, which allows a hole formation process with high positional precision for a work requiring formation of a large number of holes within a short period of time, and a laser process apparatus for practicing this method.

It is the third object of the present invention to provide a laser process apparatus, which can quickly exchange masks, and has high productivity.

It is the fourth object of the present invention to provide a laser process apparatus, which can fix a mask aligned with high precision when a mask is exchanged.

It is the fifth object of the present invention to provide a laser process apparatus, which can suppress a temperature rise of a mask so as to attain a high-precision hole formation process.

In order to achieve the first object, according to the first aspect of the present invention, a laser process apparatus, in which a plurality of holes each having a predetermined shape are formed in a work upon radiation of light from an excimer laser, comprises a mask, in which a plurality of predetermined small holes are formed in correspondence with the plurality of holes to be formed in the work, and which allows laser light from the excimer laser to pass through the small holes thereof toward the work, a projection optical system for projecting optical images each having a predetermined shape onto the work through the small holes of the mask, a measurement optical system for measuring a work position, and moving means for moving the work on the basis of a measurement result from the measurement optical system.

In this manner, since the laser process apparatus according to the first aspect of the present invention has the above-mentioned arrangement, laser light emitted from an excimer laser is radiated on the mask, and laser optical images passing through the small holes formed in the mask are focused at predetermined process positions on a work through the projection optical system, thus forming holes. In this manner, since a desired number of small holes are formed in the mask, a plurality of holes can be simultaneously formed. The process positions on the work and the laser optical images can be aligned by driving the moving means to move the work, so that the process positions and the laser optical images can coincide with each other, while observing the work using the measurement optical system.

In order to achieve the fourth object, according to the second aspect of the present invention, the laser process apparatus further comprises fixing means for fixing the mask. The fixing means comprises a mask holder and a mask press, which sandwich the mask therebetween to support it, a plurality of aligning reference holes are formed in the mask, a plurality of reference pins corresponding to the plurality of reference holes formed in the mask are arranged on one of the mask holder and the mask press, and a plurality of reference holes similar to the plurality of reference holes formed in the mask are formed in the other one of the mask holder and the mask press.

In this manner, since the laser process apparatus according to the second aspect of the present invention has the above-mentioned arrangement, when the mask is fixed, the reference pins are inserted in the reference holes formed in the mask, so that the mask can be aligned with either of the mask holder or the mask press formed with the reference pins. Therefore, as long as the mask holder or the mask press formed with the reference pins is located at a predetermined position, a processed state of a work using the exchanged mask can be quickly checked using an industrial television.

In order to achieve the fifth object, according to the third aspect of the present invention, a laser process apparatus, which forms holes in a work according to a desired pattern shape, comprises a laser light source, a mask formed with a mask pattern having the desired pattern shape, a mask holder for arranging the mask on an optical axis of laser light emitted from the laser light source, a projection optical system for radiating the laser light passing through the mask pattern onto the work, a mask holder which is arranged to cover a portion, excluding the mask pattern, of the mask on the side of the light source, a mask press for fixing the mask to the mask holder, and mask cooling means, arranged in the mask holder, for cooling the mask.

In this manner, since the laser process apparatus according to the third aspect of the present invention has the above-mentioned arrangement, laser light is radiated on a work through the mask formed with the mask pattern having the desired shape so as to form holes in the work according to the mask pattern. When laser light is radiated on a portion, other than the mask pattern, of the mask upon passing of the laser light, the mask reflects or absorbs the laser light. The laser light absorbed by the mask is converted into heat, and the heat causes a temperature rise of the mask. However, since the portion, other than the mask pattern, of the mask is covered with the mask holder, the amount of the laser light radiated on the mask can be decreased, and the mask cooling means provided to the mask holder can suppress the temperature rise of the mask.

In order to achieve the second object, according to the fourth aspect of the present invention, a hole forming process position aligning method used when a plurality of holes are formed at predetermined process positions on a process surface of a work using laser light, comprises the radiation step of converting the laser light into desired light beams in correspondence with the plurality of holes to be formed, and radiating the light beams onto the process positions on the process surface, the reference value defining step of defining central positions of at least two light beams radiated on the process surface as position reference values, the measurement step of measuring the process positions, irradiated with the at least two light beams, on the process surface of the work, the calculation step of calculating position shift amounts between the process positions and the reference positions by comparing the measured process positions with the corresponding position reference values, and the moving step of moving the work on the basis of the calculated position shift amounts.

In this manner, since the hole formation process position aligning method according to the fourth aspect of the present invention is executed, the position shift amounts between the central positions of at least two light beams radiated on a process surface of a work, and process positions radiated with the light beams on the process surface are calculated, and a work is moved based on the calculated position shift amounts, thereby aligning the process positions with the central positions of the light beams. In this manner, since light beams to be radiated on the process surface of the work correspond to a plurality of holes to be formed, a plurality of process positions can be simultaneously aligned.

In addition, in order to achieve the second object, according to the fifth aspect of the present invention, a laser process apparatus, which comprises a laser light source, and a projection optical system for radiating laser light emitted from the laser light source onto a process surface of a work mounted on a moving stage, and is arranged to form a plurality of holes at predetermined process positions on the process surface of the work, comprises a mask which is arranged between the laser light source and the projection optical system, and is formed with a mask pattern for converting the laser light into desired laser light beams corresponding to the plurality of holes to be formed, storage means for storing position reference values indicating central positions of at least two holes of processed holes formed in a processed work, a transmission illumination system for illuminating the process surface of a non-processed work from a side of the laser light source, a reflection optical system for illuminating the at least two processed holes of the processed work from a side opposite to a side where the laser light source is arranged, an observation optical system for, when the process surface of the non-processed work is illuminated by the transmission illumination system, observing the process positions corresponding to the at least two processed holes, and for, when the at least two processed holes of the processed work are illuminated by the reflection optical system, observing the at least two processed holes, an image processing system for obtaining position measurement values indicating the process positions observed by the observation optical system, and for obtaining hole central positions of the at least two processed holes observed by the observation optical system, and a control system for calculating position shift amounts by comparing the position measurement values obtained by the image processing system with the corresponding position reference values stored in the storage means, driving the moving stage on the basis of the calculated position shift amounts, and storing the hole central positions obtained by the image processing system in the storage means as the position reference values.

In this manner, since the laser process apparatus according to the fifth aspect of the present invention has the above-mentioned arrangement, laser light emitted from the laser light source is converted into laser beams corresponding to a plurality of holes to be formed, and a non-processed work is moved on the basis of the position shift amounts between the central positions of at least two processed holes of the work formed with the holes by these laser beams, and process positions on a work corresponding to these processed holes. Therefore, a plurality of process positions of the non-processed work can be simultaneously aligned with the laser beams. Furthermore, since the laser beams are radiated on the process surface of the nonprocessed work, a plurality of holes can be simultaneously formed.

In order to achieve the third object, according to the sixth aspect of the present invention, a laser process apparatus, in which a plurality of holes are formed in a work by radiating laser light onto the work through a mask formed with a plurality of openings each having a predetermined shape, comprises mask position adjustment means for moving the mask to an arbitrary position, a measurement optical system for measuring positions of the plurality of holes formed in the work, and a control system for calculating a shift amount of the mask with respect to the laser light on the basis of the positions of the plurality of holes measured by the measurement optical system, and correcting the shift amount by moving the mask through the mask position adjustment means.

In addition, in order to achieve the third object, according to the seventh aspect of the present invention, a laser process apparatus, in which a plurality of holes are formed in a work by radiating laser light onto the work through a mask formed with a plurality of openings each having a predetermined shape, comprises mask position adjustment means for moving the mask to an arbitrary position, a measurement optical system for measuring areas of the plurality of holes formed in the work, and a control system for calculating a shift amount of the mask with respect to the laser light on the basis of the areas of the plurality of holes measured by the measurement optical system, and correcting the shift amount by moving the mask through the mask position adjustment means.

In this manner, since the laser process apparatus has the arrangement according to the sixth and seventh aspects of the present invention, when a mask is exchanged, the positions or areas of holes actually formed in a work are obtained by the measurement optical system. The control system obtains a shift amount of the mask with respect to the laser optical axis on the basis of the hole positions or areas, and moves the mask through the mask position adjustment means to correct the shift amount. Thus, the mask position can be adjusted without requiring a manual operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A, 2B, and 2C are respectively a perspective view, a sectional view, and a front view showing a shape of a work W after a hole formation process;

FIG. 3A is a view showing an optical path of an illumination optical system;

FIG. 3B is a front view showing an elliptic mask of the illumination optical system;

FIG. 3C is a view showing the positions of concave and convex cylindrical lenses of the illumination optical system;

FIGS. 15(a) to 15(g) are views showing procedures for removing images of scratches from an image of a groove hole displayed on an industrial television;

FIGS. 16(a) to 16(d) are views showing filtering processing of the image processing system for removing scratches;

FIGS. 19A and 19B are respectively a perspective view and a sectional view showing the ink-jet head;

FIG. 20A is a front view showing discharge orifices of the ink-jet head;

FIG. 20B is a sectional view showing groove holes communicating with the discharge orifices of the ink-jet head;

FIG. 21 is a flow chart showing a hole position measurement operation of the image processing system;

FIG. 29 is a block diagram showing a power measurement device;

FIG. 30 is a graph showing an illumination distribution of laser light onto a mask;

FIGS. 31(a) to 31(d) are flow charts showing an example of an operation of the laser hole forming process machine;

DETAILED DESCRIPTION OF THE PREFERRED EMBODIMENTS

An embodiment of a laser process machine according to the present invention will now be described in detail with reference to the accompanying drawings. In this embodiment, the present invention is applied to a laser hole forming process machine.

Figure 1A:
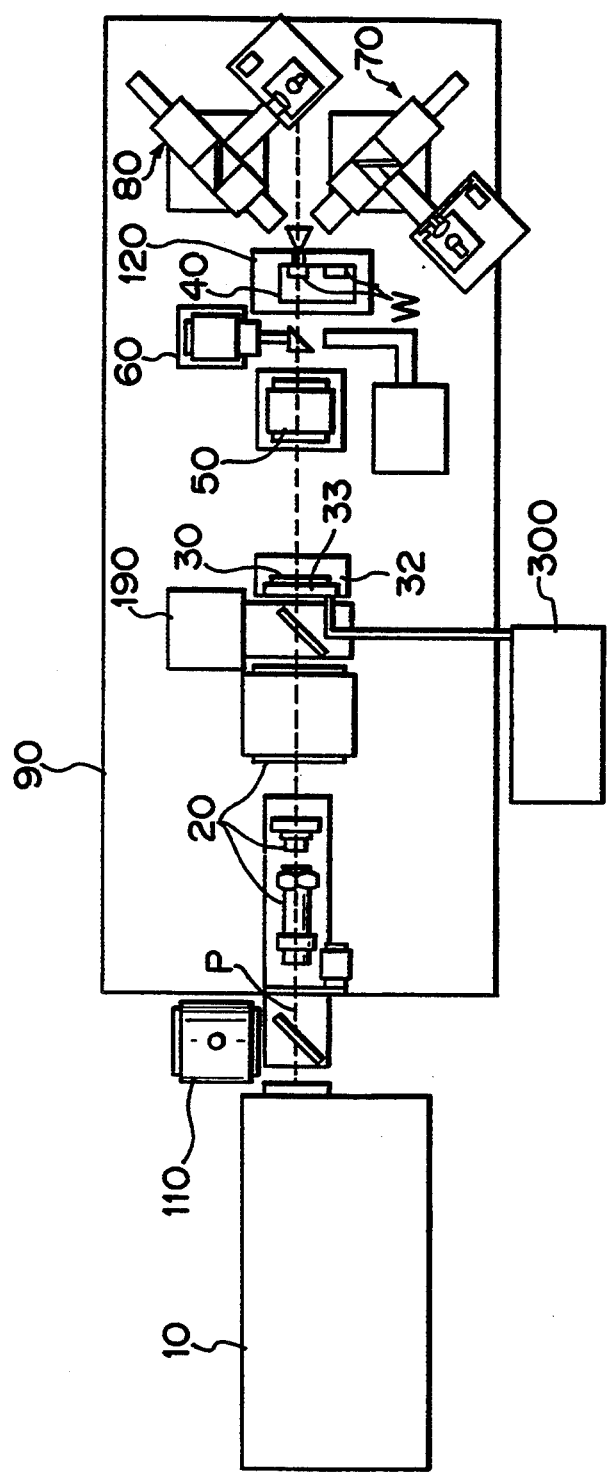
FIGS. 1A and 1B are respectively a plan view and a side view showing an arrangement of a laser hole forming process machine to which an embodiment of a laser process machine according to the present invention is applied.
Figure 1B:
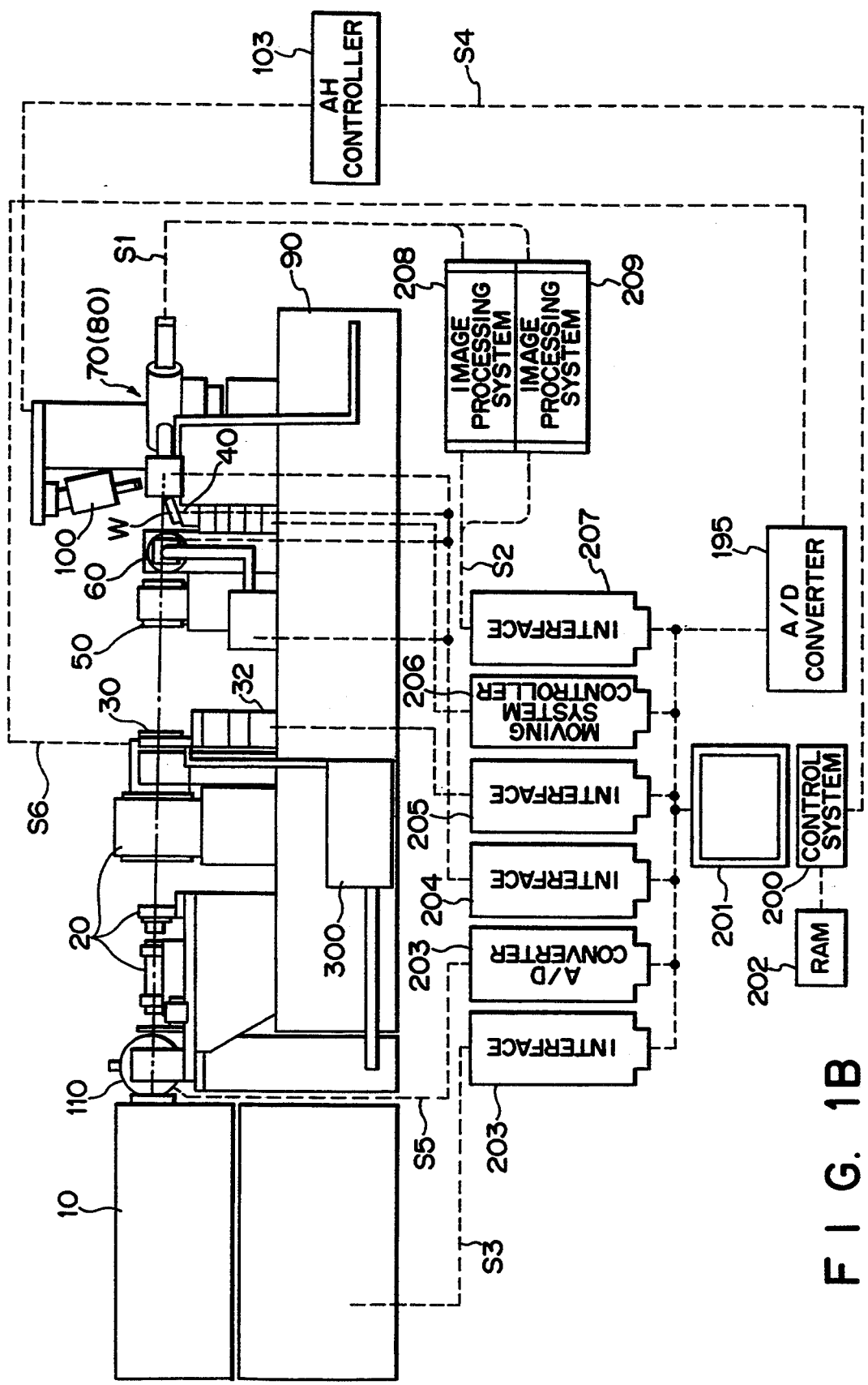

FIGS. 1A and 1B are respectively a plan view and a side view of the laser hole forming process machine according to this embodiment.

In the laser hole forming process machine of this embodiment, ultraviolet laser light P emitted from a laser light source 10 using an excimer laser is radiated on a mask 30 for converting the light into a desired pattern in correspondence with holes to be formed. A mask image passing through the mask 30 is radiated on a work, or workpiece, W such as an ink-jet head, which is attached to be aligned in a direction perpendicular to the laser light P, thereby forming holes serving as ink discharge orifices in the work W.

The laser hole forming process machine of this embodiment comprises an illumination optical system 20 for uniformly radiating the laser light P emitted from the laser light source 10 onto the mask 30, a mask position adjustment mechanism 32 for adjusting the position of the mask 30, a moving stage 120 comprising an aligning jig 40 to which the work W is attached, a projection optical system 50 for projecting a mask image emerging through the mask 30 onto the work W, a transmission illumination system 60 for radiating illumination light onto the work W from the side of the laser light source 10 when the work W is aligned, and reflection optical systems 74 and 84 (see FIG. 13A) for radiating illumination light from a direction opposite to that of the transmission illumination system 60.

Measurement optical systems 70 and 80 for respectively focusing optical images formed by radiating illumination light onto the work W by the transmission illumination system 60, and the reflection optical systems 74 and 84 on two industrial televisions (to be abbreviated to as ITVs hereinafter) 71 and 81 are mounted on an apparatus frame 90. Furthermore, the laser hole forming process machine comprises two image processing systems 208 and 209 for fetching image signals of images focused on the ITVs 71 and 81, and executing signal processing associated with the aligning operation of the work W, and a control system 200, having a display 201, for controlling the emission operation of the laser light source 10 and the aligning operation of the work W.

The structure of the work W as an object to be subjected to a hole formation process by the laser hole forming process machine will be described below with reference to FIGS. 2A to 2C.

FIGS. 2A to 2C are respectively a perspective view, a sectional view, and a front view showing the structure of the work W after hole formation.

In this embodiment, the work W is set to constitute an ink-jet head for discharging an ink in a predetermined pattern in, e.g., a printer. More specifically, the work W is constituted by a top member $W_2$ in which 64 or 128 groove holes G [FIGS. 2A to 2C illustrate only four groove holes $G_1$, $G_2$, $G_3$, and $G_4$ for the sake of illustrative and descriptive conveniences] serving as ink flow paths are juxtaposed in the longitudinal direction, and a planar member $W_3$ (the rear surface thereof is defined as a process surface $W_1$) serving as an orifice plate.

Holes H [FIGS. 2A to 2C illustrate only four holes $H_1$, $H_2$, $H_3$, and $H_4$ for the sake of illustrative and descriptive conveniences] to be formed in the work W and serving as discharge orifices are formed in the planar member $W_3$ in one or a plurality of operations by laser light passing through the mask 30 in correspondence with the groove holes G ($G_1$, $G_2$, $G_3$, and $G_4$). Two works W are mounted on the aligning jig 40, so that the process surfaces $W_1$ of the planar members $W_3$ face the laser light source 10. Thereafter, these works are aligned with respect to laser light.

In the laser aperture forming processing machine of this embodiment, the work W is aligned as follows. That is, the central positions of two predetermined groove holes (e.g., groove holes at two ends) are caused to coincide with the central positions of two holes, corresponding to these two groove holes, of a plurality of holes formed in the work W in the previous process step. The central positions of these holes and groove holes are obtained by executing signal processing of image signals of images of the holes and groove holes observed by the ITVs 71 and 81 in the image processing systems 208 and 209. The central positions of the holes are stored as reference values in a RAM 202 [see FIG. 1B] as a storage means through the control system 200. In the control system 200, the central positions of the groove holes are compared with the reference values to calculate a shift amount of the work W, and the calculated shift amount is supplied to a moving system controller 206 as a moving amount. The moving stage 120 is driven through the moving system controller 206, thereby causing the centers of the holes of the work W to coincide with the centers of the groove holes.

In this laser hole forming process machine, laser light (200 Hz, 50 W, 28 mm×6 mm) emitted from the laser light source 10 is incident on the illumination optical system 20, and thereafter, radiates the mask 30. In the illumination optical system 20, as shown in FIG. 3A, the laser light spot pattern is converted into a circular pattern using a combination of an elliptic mask 21, a concave cylindrical lens 22, and a convex cylindrical lens 23. In this conversion, the elliptic mask 21 having a mask hole 211 (FIG. 3B) is arranged at the center of the laser light P, which is emitted to have a 28 mm×6 mm rectangular spot pattern. The spot pattern of the laser light P is converted into an elliptic pattern by the elliptic mask 21. Then, the concave cylindrical lens 22 is arranged to expand the laser light in a direction of the small width (6 mm side). The laser light is then converted to parallel light P2 having a circular spot pattern with a spot size of 28 mm by the convex cylindrical lens 23. This conversion is attained as follows. That is, the two concave and convex cylindrical lenses 22 and 23 are arranged on the optical axis of the laser light P, so that the ratio $f_1$:$f_2$ of their distances $f_1$ and $f_2$ from the elliptic mask 22 is set to be $f_1:f_2=6:28$, as shown in FIG. 3C, to attain a power ratio of the concave and convex cylindrical lenses 22 and 23 of 6:28 (concave:convex).

The circular parallel light $P_2$ having the spot size of 28 mm is converted into circular parallel light $P_3$ having a spot size of 20 mm by a beam compressor, which is constituted by arranging convex and concave lenses 24 and 25, so that the ratio $f_3:f_4$ of their distances $f_3$ and $f_4$ to the focal point position is set to be 28:20 so as to have the same focal point position.

Figures 4A, 4B:
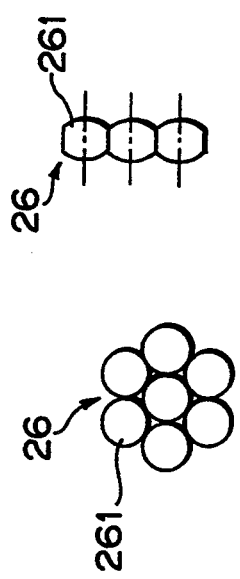
FIGS. 4A and 4B are respectively a front view and a side view showing a fly-eye lens of the illumination optical system.
Figure 5:
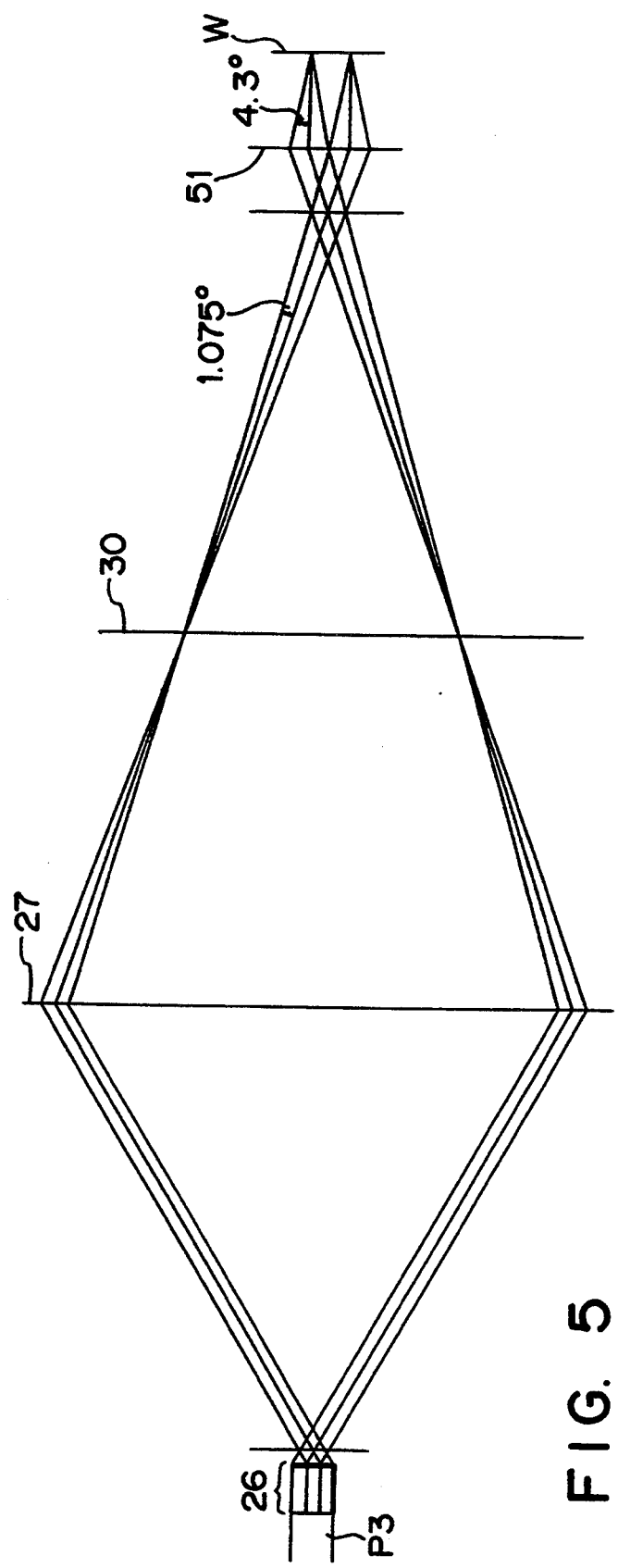
FIG. 5 is a view showing an optical path of the illumination optical system.
Figure 6:
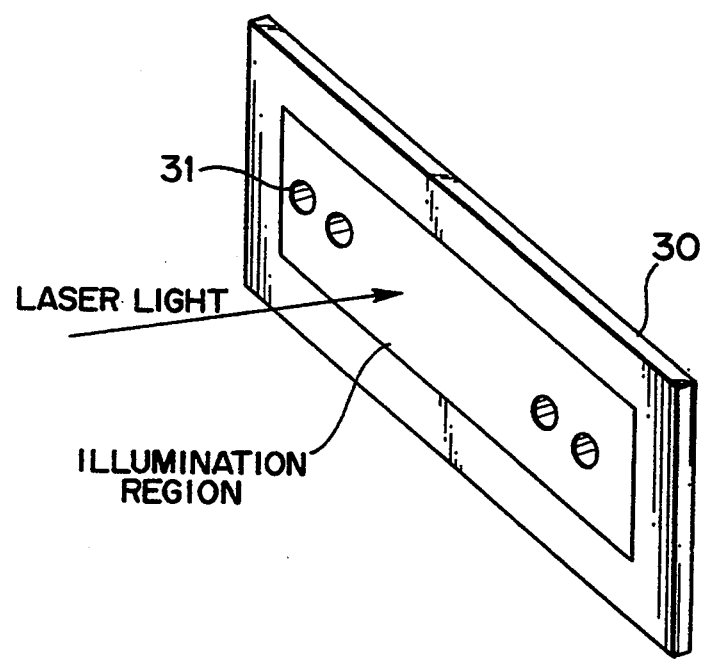
FIG. 6 is a perspective view showing a mask.

A Köhler illumination fly-eye lens 26, in which seven convex lenses 261 having a diameter of 6 mm are arranged, as shown in FIGS. 4A and 4B, and a field lens 27, are arranged in turn on the optical axis of the parallel light $P_3$, as shown in FIG. 5, thereby splitting the parallel light $P_3$ into seven beams. The split beams illuminate mask holes 31, which are aligned on a 19-mm line formed on the mask 30, and have a pattern of a hole to be formed, at a predetermined inclination angle, as shown in FIG. 6.

The mask 30 is prepared by forming the mask holes 31, having a diameter four times that of a hole to be formed, in a 25-μm thick Ni plate by etching.

The mask 30 is mounted on the mask position adjustment mechanism 32 while being clamped between a mask holder 33 and a mask press 34. The position of the mask 30 is adjusted according to an instruction supplied from the control system 200 through an interface 205.

Figure 7A:
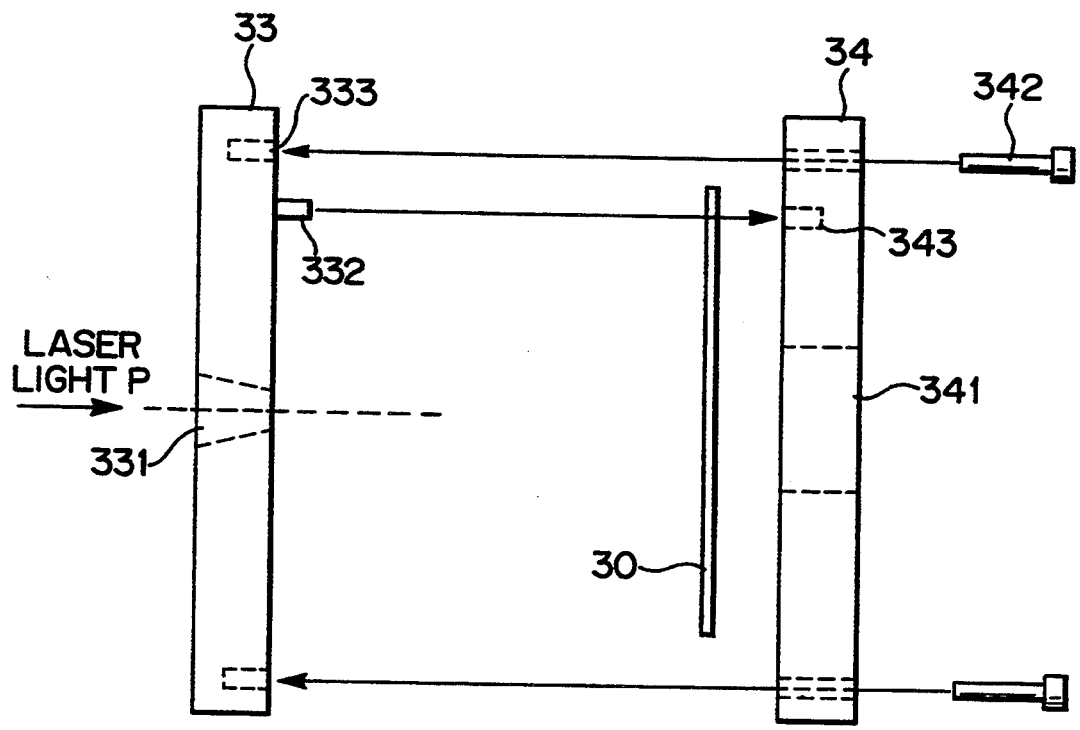
FIG. 7A is an exploded side view showing a fixing state of the mask.
Figure 7B:
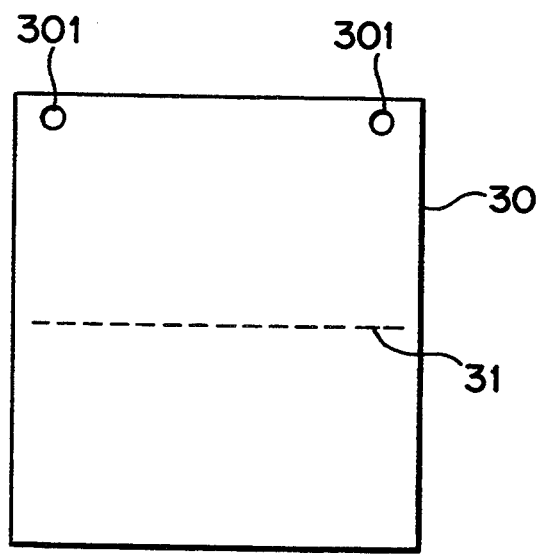
FIG. 7B is a front view showing the shape of the mask.

FIG. 7A is a side view showing a schematic structure of the mask 30, and FIG. 7B is a plan view of the mask 30 in FIG. 7A.

As shown in FIG. 7B, the plurality of mask holes 31 each having a diameter of 120 μm are formed in line in the central portion of the mask 30. In addition to these holes, two reference holes 301 are formed in the mask 30. These reference holes 301 are set to serve as aligning reference when the mask 30 is mounted, and are defined by through holes each having a diameter of 2 mm.

Figures 7C, 7D:
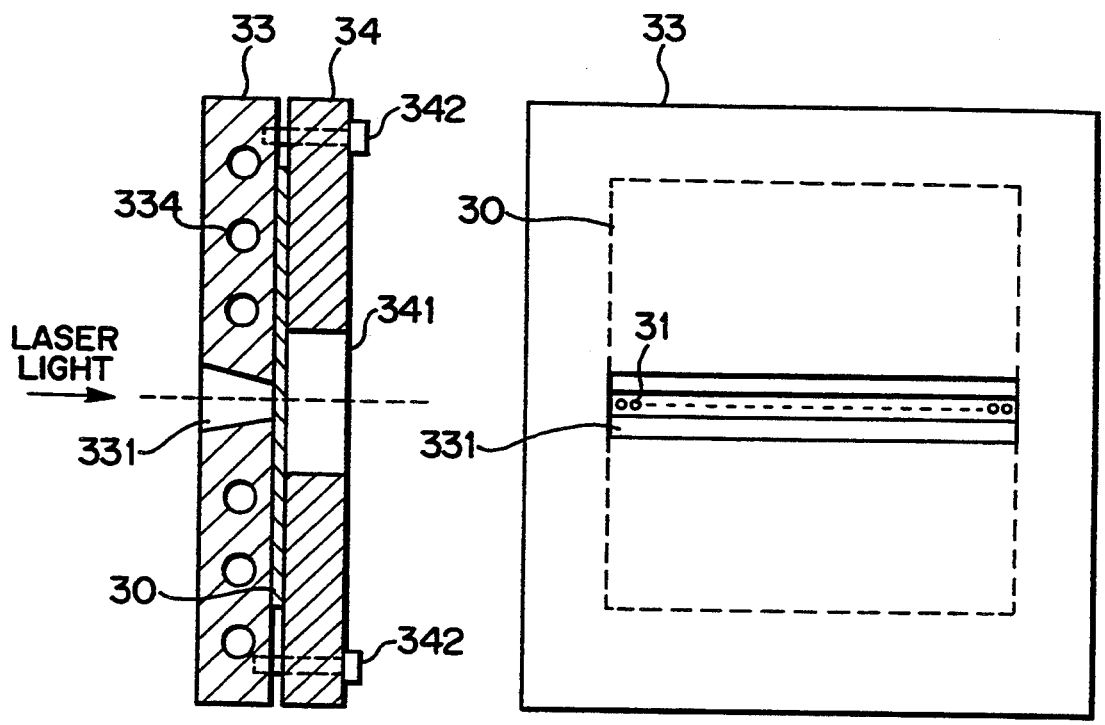
FIG. 7C is a front view showing the shape of a mask holder.
FIG. 7D is a side sectional view showing a fixing state wherein the mask is clamped between the mask holder and a mask press.

The mask holder 33 having a thickness of 8 mm is fixed on a mask holder aligning jig 325 standing upright on the mask position adjustment mechanism 32 (to be described later). In order to radiate only light beams necessary for forming a mask image onto the mask 30, as shown in FIG. 7C, a window 331 formed to extend along the aligning direction of the mask holes 31 is formed in the central portion of the mask holder 33. Since the laser light P is focused on the mask 30 by the illumination optical system 20, the window 331 is tapered narrower toward the side of the mask 30. Mask aligning reference pins 332 each having a diameter of 2 mm are arranged on the mask holder 33 at positions corresponding to the reference holes 301 formed in the mask 30.

A window 341 for projecting the laser light P passing through the mask holes 31 onto the work W is formed in the central portion of the mask press 34 having a thickness of 7 mm. Reference holes 343, each having a diameter of 2 mm, for aligning the mask 30 are arranged on the mask press 34 at positions corresponding to the reference holes 301 and the reference pins 332.

The mask 30 is aligned by inserting the reference pins 332 in the reference holes 343 via the reference holes 301. In this case, the tolerance between the reference pin 332 and the reference hole 301 must be ±10 μm or less. Furthermore, fixing screws 342 are screwed in fixing screw holes 333, thereby completely fixing the mask holder 33 and the mask press 34 to each other.

Thus, as shown in FIG. 7D, the mask 30 can also be fixed.

The reference holes 301 and 343, and the reference pins 332 need only two-dimensionally align the mask 30. Therefore, the numbers of these holes and pins are not limited as long as two or more holes and pins are provided. In this embodiment, the reference pins 332 are arranged on the mask holder 33, and the reference holes 343 are formed in the mask press 34.

Alternatively, the reference holes may be formed in the mask holder 33, and the reference pins may be arranged on the mask press 34.

Figure 7E:
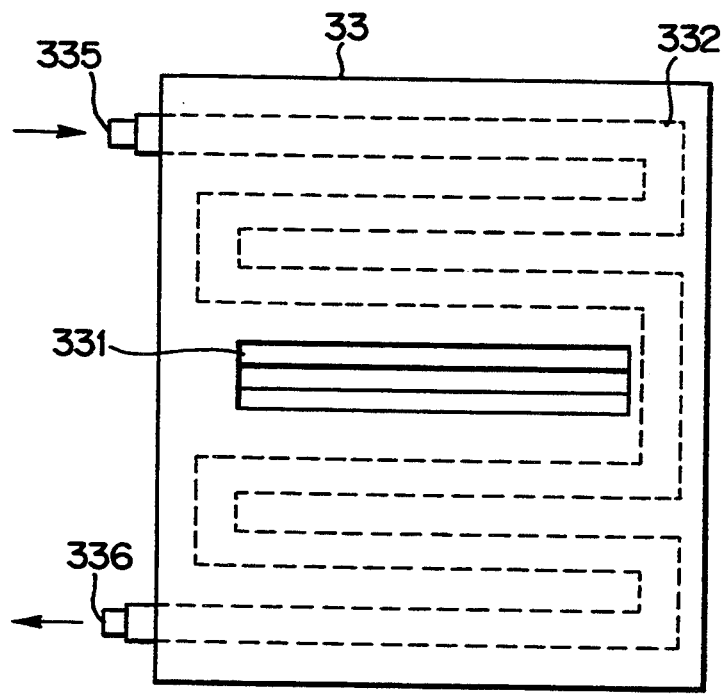
FIG. 7E is a front view showing a forming state of a liquid channel in the mask holder.

In the mask holder 33 described above, as shown in FIG. 7E, a flow path 334, through which cooling water for cooling the mask 30 flows, is formed in a bent state over at least substantially the entire surface portion contacting the mask 30. In the flow path 334, cooling water supplied from a cooling water supply source 300 shown in FIGS. 1A and 1B is supplied to flow from a flow-in port 335 toward a flow-out port 336.

Figures 7F, 7H:
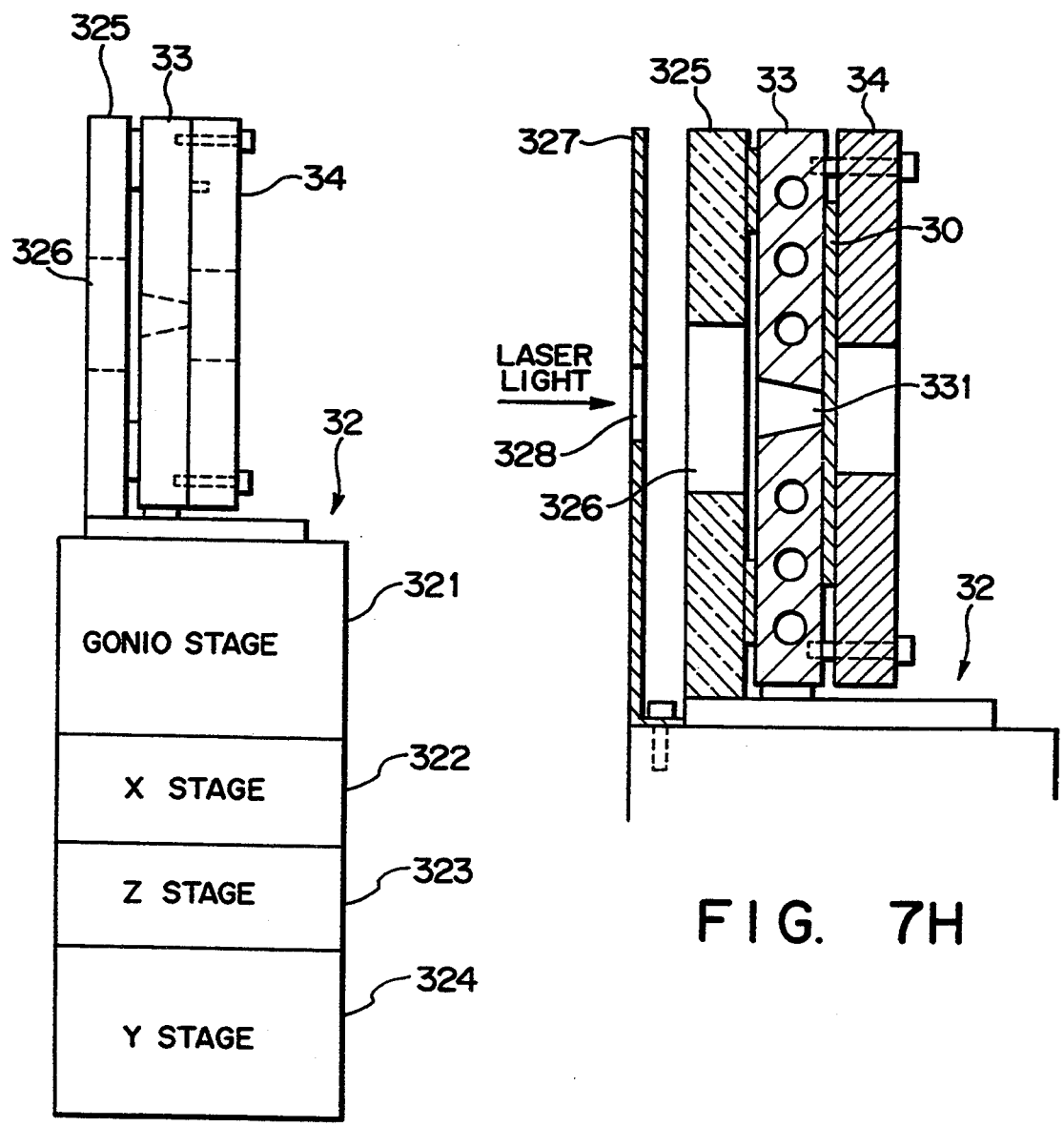
FIGS. 7F and 7G are respectively a side view and a front view showing an arrangement of a mask position adjustment mechanism.
FIG. 7H is a side sectional view showing an arrangement of a mask position adjustment mechanism 32 arranged with a second mask according to a modification of the embodiment shown in FIG. 1.

The mask 30 clamped between the mask holder 33 and the mask press 34, as shown in FIG. 7D, is mounted on the mask holder aligning jig 325 on a side opposite to the laser light source, as shown in FIG. 7F. A window 326 for allowing the laser light to pass therethrough is formed in the mask holder aligning jig 325 to extend in the same direction as the window 331 of the mask holder 33. The window 326 is formed, so that its height is larger than the height, on the side of the laser light source, of the window 331 of the mask holder 33. When the mask holder 33 is fixed to the mask holder aligning jig 325, they are adjusted, so that the window 331 of the mask holder 33 is located at the central portion of the window 326 of the mask holder aligning jig 325.

Figure 7G:
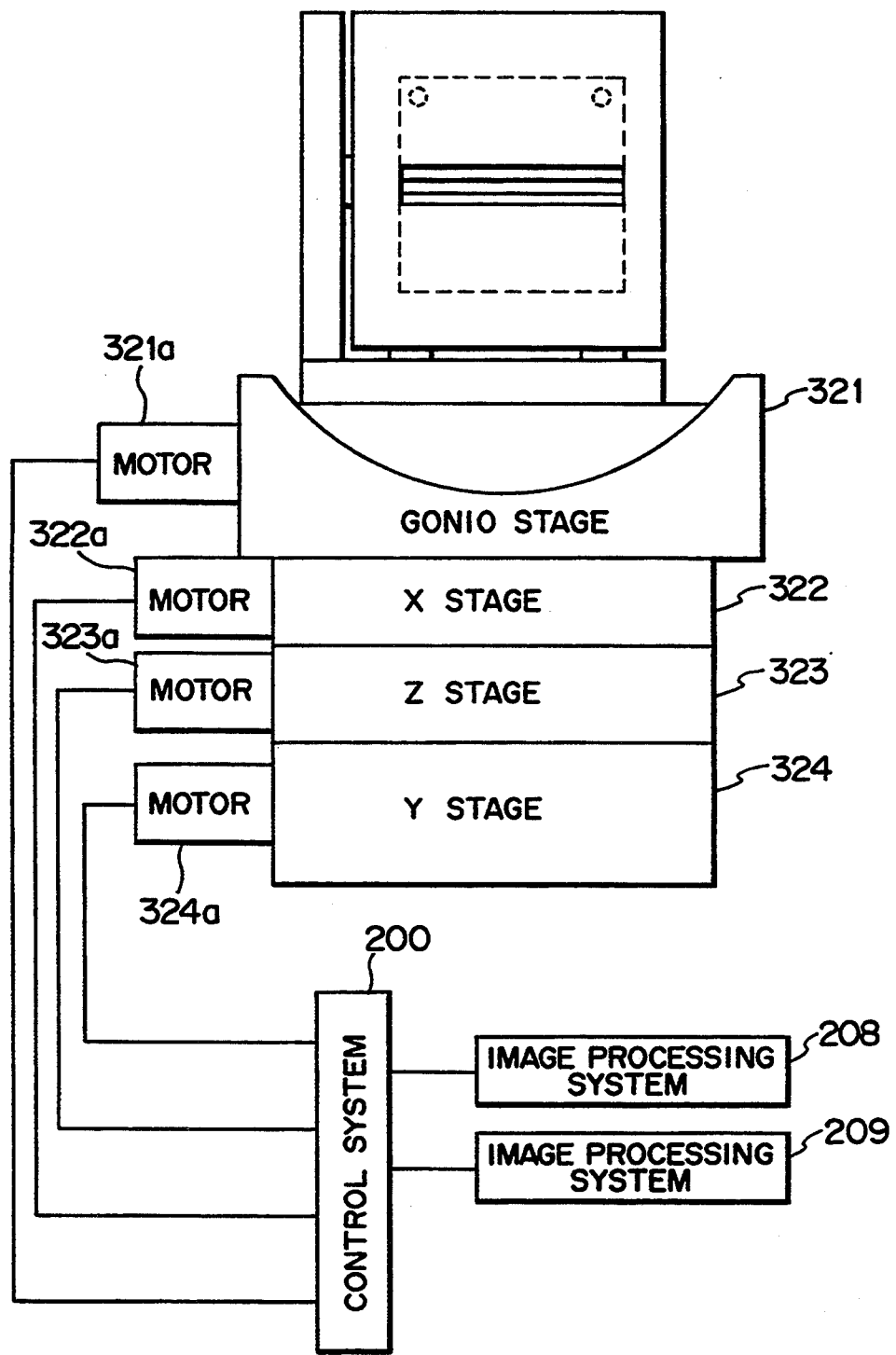

The mask holder aligning jig 325 stands upright on the mask position adjustment mechanism 32 constituted by a goniostage 321, an X stage 322, a Z stage 323, and a Y stage 324, so that the position of the jig 325 is adjustable. The stages 321 to 324 are respectively moved by independent motors 321a, 322a, 323a, and 324a, as shown in FIG. 7G. The motors 321a to 324a are driven by drive signals supplied, through the interface 205, from the control system 200 [FIG. 1B] connected to the image processing systems 208 and 209.

The goniostage 321 is used for adjusting the mask position in the rotational direction having the laser optical axis as the center. The X stage 322 is used for adjusting the position of the mask 30 in the aligning direction of the mask holes 31. The Z stage 323 is used for adjusting the mask position in a direction perpendicular to the laser optical axis and the aligning direction of the mask holes 31. The Y stage 324 is used for adjusting the mask position in the direction of the laser optical axis. With these stages, the mask holes 31 formed in the mask 30 are adjusted to be located in the laser optical axis.

In this embodiment, as shown in FIG. 7H, a second mask 327 as a light-shielding plate formed with a window 328 for allowing laser light to pass therethrough may be arranged on the mask position adjustment mechanism 32 on the laser light source side of the mask holder aligning jig 325 to be separated from the mask holder aligning jig 325, as shown in FIG. 7H. In this case, the height of the window 328 formed in the second mask 327 is decreased to be smaller than that of the window 326 of the mask holder aligning jig 325 so as to decrease the amount of laser light radiated on the mask holder 33, although the height depends on the forming position of the window 328. Thus, the height of the window 328 can be substantially the same as the height, on the laser light source side, of the window 331 of the mask holder 33. In this manner, since the amount of light radiated on the mask holder 33, which contacts the mask holder aligning jig 325 and the mask 30, is decreased, the temperature rise of the mask 30 can be suppressed. The temperature of the second mask 327 is considered to be increased since a larger amount of light than that on the mask holder 33 is radiated on the second mask 327. However, as described above, since the second mask 327 is arranged to be separated from the mask holder aligning jig 325, the temperature rise of the second mask 327 will not influence the mask 30.

Figure 8:
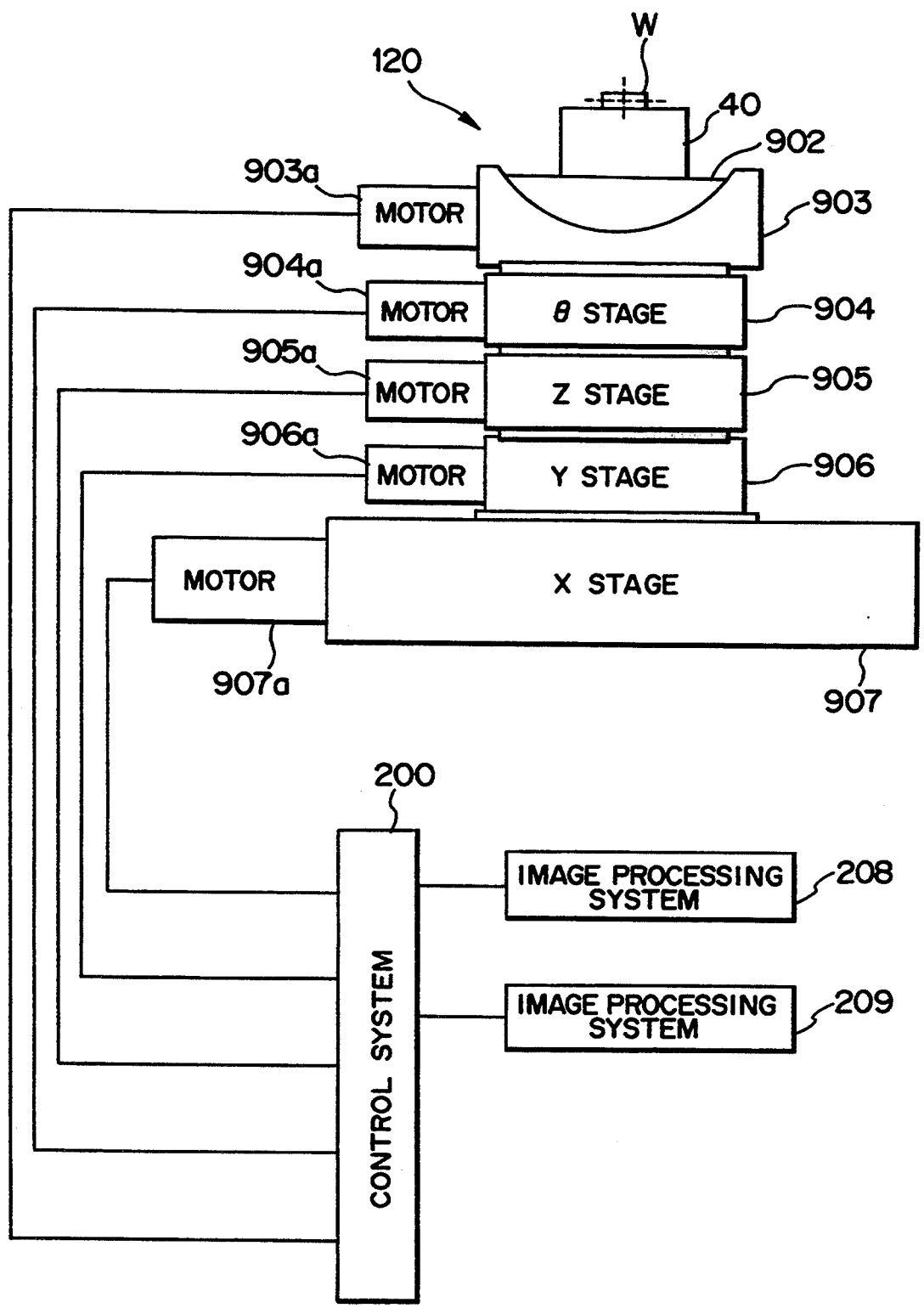
FIG. 8 is a diagram showing an arrangement of a moving stage.

The arrangement of the moving stage 120 for adjusting the position of the work W will be described below with reference to FIG. 8.

The work W is placed on the aligning jig 40, and the aligning jig 40 is arranged on a table 902. The table 902 is arranged on a goniostage 903, a $\theta$ stage 904, a Z stage 905, a Y stage 906, and an X stage 907. These stages are respectively moved by corresponding motors $903a$ to $907a$, and the motors $903a$ to $907a$ are driven by the control system 200 in the same manner as in control of the mask position adjustment mechanism 32 shown in FIG. 7G.

Thus, the moving stage 120, which can move the work W to an arbitrary position by these stages 903 to 907, can be constituted. More specifically, the moving stage 120 can be moved in a total of five axial directions, i.e., the laser optical axis direction (Y direction), an axial direction (Z direction) perpendicular to the laser optical axis and the aligning direction of the holes, the aligning direction (X direction) of the holes, and the rotational direction ($\theta_Y$ direction) having the laser optical axis as a rotational axis. The moving stage 120 is operated according to an instruction supplied from the control system 200 through the moving system controller 206 so as to align the work W.

As described above, of the seven light beams split by the illumination optical system 20, and radiated on the mask 30, light beams, which emerge from the mask 30, and have a shape necessary for forming a hole, are focused on the work W by a telecentric $\frac{1}{4}$ reduction projection lens 51 forming the projection optical system 50, as shown in FIG. 5, thus forming holes having a necessary shape.

Figure 9A:
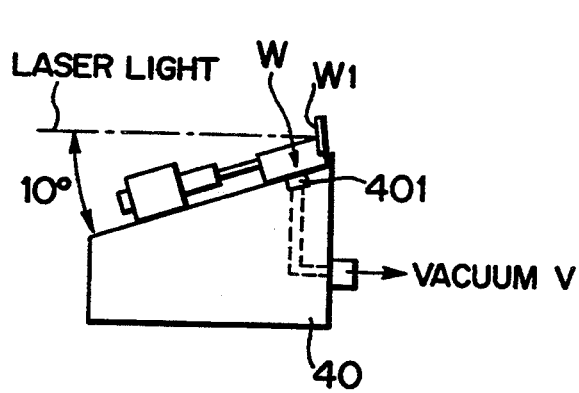
FIG. 9A is a side view showing an aligning jig.

As shown in FIG. 9A, the work W is mounted on the aligning jig 40, so that the process surface $W_1$ is inclined toward the laser light source 10.

Figure 9B:
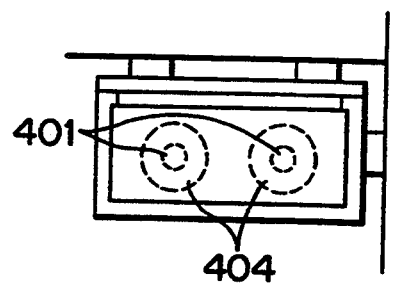
FIG. 9B is a plan view showing vacuum holes of the aligning jig.
Figure 9C:
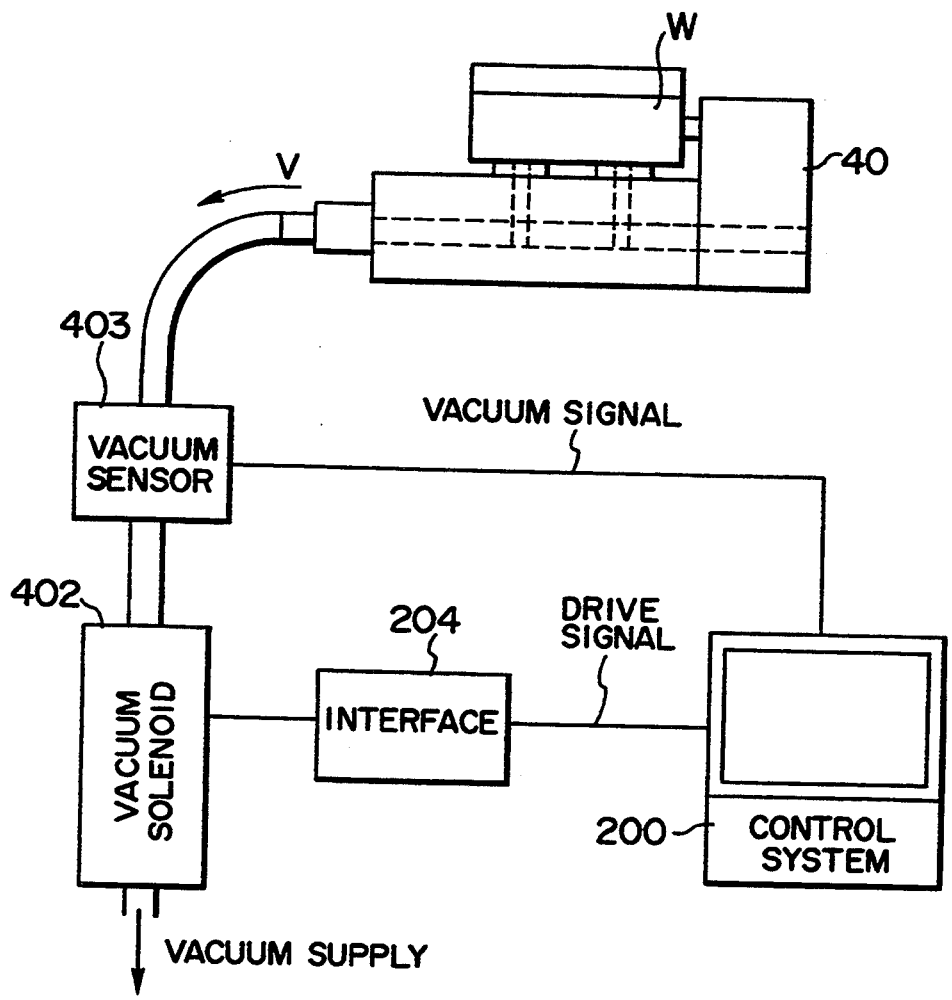
FIG. 9C is a block diagram showing a work chucking mechanism of the aligning jig.

The aligning jig 40 comprises two sets of two vacuum holes 401 for holding two works W, as shown in FIG. 9B, and also comprises an abutting mechanism for fixing the works W chucked and held by the vacuum holes 401. In the aligning jig 40, as shown in FIG. 9C, a suction operation by a suction source (not shown) is performed by driving a vacuum solenoid 402 in response to a drive signal supplied from the control system 200 through an interface 204, thereby chucking and holding two works W by each two vacuum holes 401. The suction pressures of the vacuum holes are always detected by a vacuum sensor 403, and the control system 200 monitors the holding states of the works W on the basis of the detected pressures.

Figure 10:
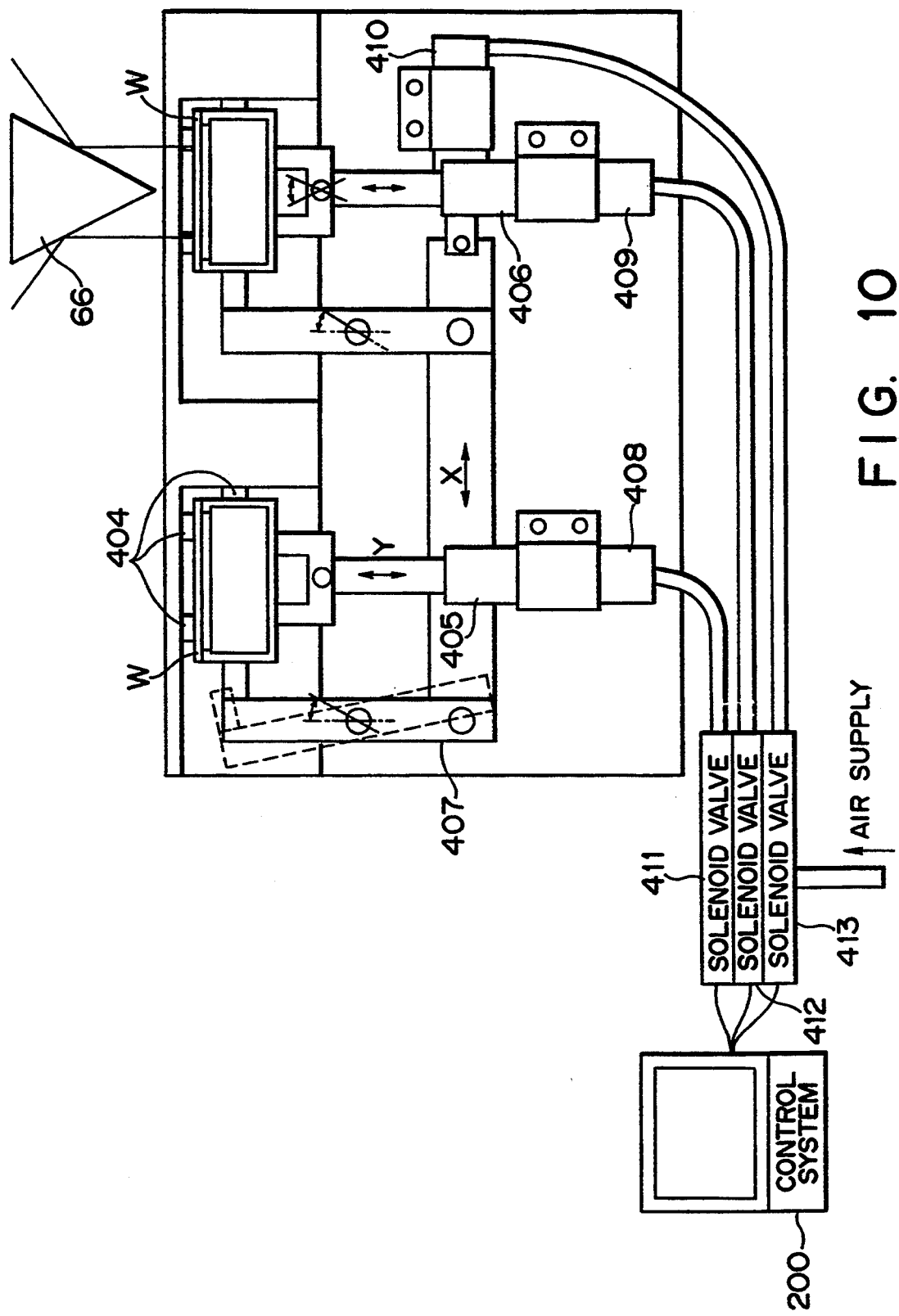
FIG. 10 is a plan view showing an abutting mechanism of the aligning jig.

As shown in FIGS. 9B and 10, the aligning jig 40 has a total of five aligning references 404, i.e., two points on the chucking/holding surface, and three points on the side surfaces of the work W. After the works W are supplied onto the aligning jig 40 by an auto hand 100, the works W are held by vacuum suction. As shown in FIG. 10, the works W are then abutted in the optical axis direction (a direction of an arrow Y in FIG. 10) of the laser light P by two abutting mechanisms 405 and 406 from the optical axis direction of the laser light P, and thereafter, are abutted in the hole aligning direction (a direction of an arrow X in FIG. 10) by an abutting mechanism 407 from the hole aligning direction, thereby fixing the two works W.

The two abutting mechanisms 405 and 406 respectively correspond to the two works W held on the aligning jig 40. These abutting mechanism 405 and 406, and the abutting mechanism 407 in the hole aligning direction respectively open/close solenoid valves 411, 412, and 413 upon an instruction from the control system 200, thereby driving air cylinders 408, 409, and 410.

After the works W are fixed by the abutting mechanisms 405, 406, and 407, the groove positions of the work W are measured.

Figure 11:
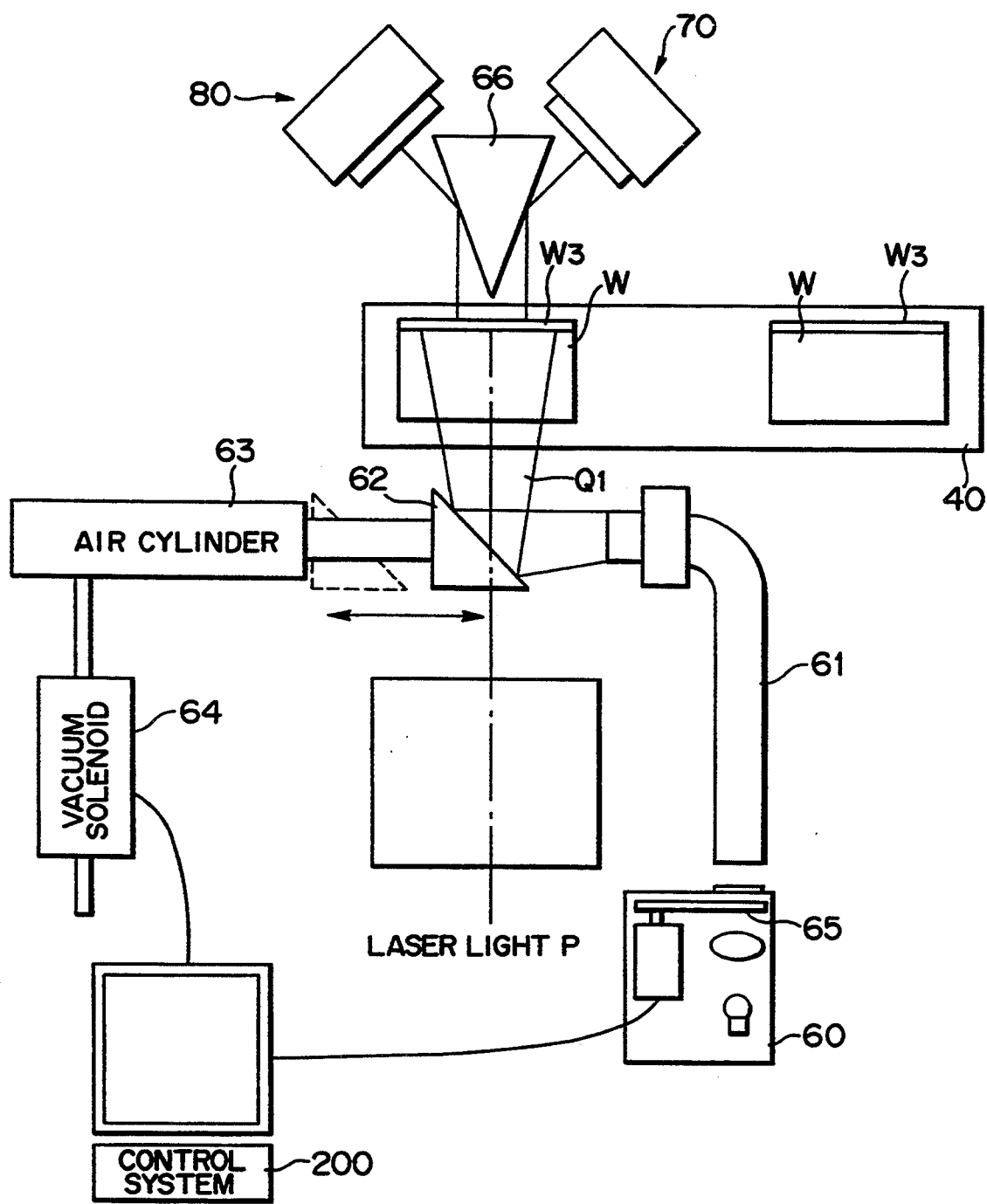
FIG. 11 is a diagram showing an arrangement of a transmission illumination system.

The groove positions are measured as follows. That is, transmission illumination light $Q_1$ from the transmission illumination system 60 on the side of the laser light source 10 is radiated on the work W to cause optical images of the grooves to pass through the planar members $W_3$, and the optical images are observed by the measurement optical systems 70 and 80 on the side opposite to the laser light source 10. The transmission illumination system 60 has an optical fiber 61 for guiding the transmission illumination light $Q_1$ toward the work W, and a 45° mirror 62, as shown in FIG. 11, so as to radiate the transmission illumination light $Q_1$ onto the work W.

The optical fiber 61 is arranged, so that light emerging therefrom is perpendicular to the optical axis of the laser light P. The 45° mirror 62 is arranged, so that the transmission illumination light $Q_1$ guided by the optical fiber 61 is reflected in the same direction as the laser light P. Furthermore, the 45° mirror 62 is attached to an air cylinder 63, which is restricted in the rotational direction. Thus, the 45° mirror 62 can be moved to a position where the mirror does not shield the laser light upon emission of the laser light.

In the transmission illumination system 60, a shutter 65, which shields output light, is moved in response to an instruction supplied from the control system 200 through the interface 204, thereby emitting the output light. The 45° mirror 62 can be similarly moved by driving the air cylinder 63 through a vacuum solenoid 64 in response to an instruction from the control system 200.

Figure 12:
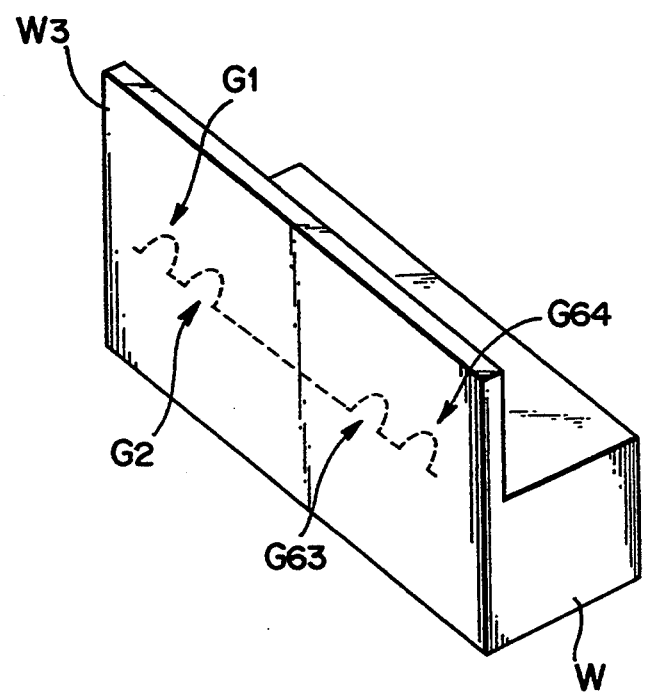
FIG. 12 is a plan view showing an example of a work.

If 64 holes are to be formed in the work W, the grooves to be observed are a second groove hole $G_2$ and a 63rd groove hole $G_{63}$, which are inwardly neighboring grooves of those (a first groove hole $G_1$ and a 64th groove hole $G_{64}$) at two ends, as shown in FIG. 12. Optical images of these groove holes are reflected by a mirror 66, which has two reflection surfaces arranged on their optical paths, and are incident on the measurement optical systems 70 and 80 without interfering with each other, as shown in FIG. 11.

Figure 13A:
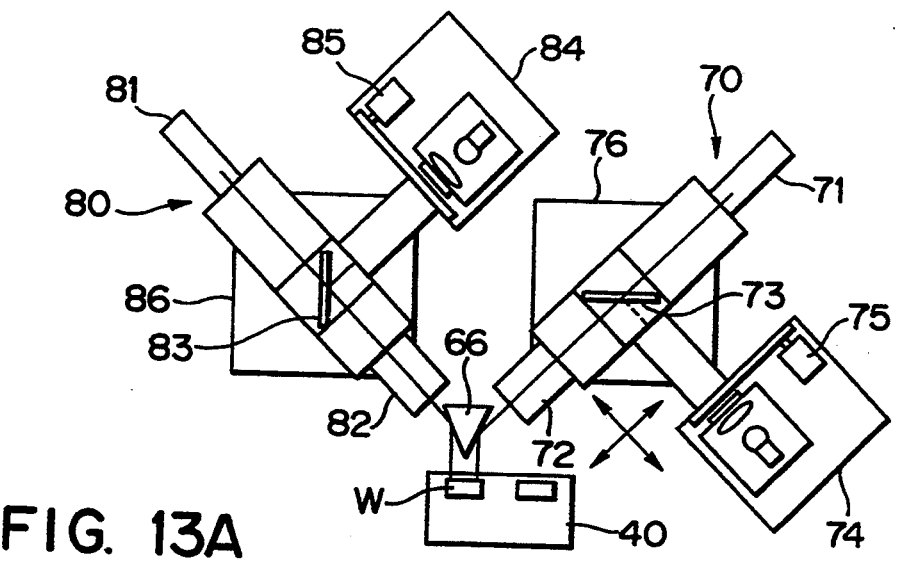
FIG. 13A is a plan view showing a measurement optical system.

The structures of the measurement optical systems 70 and 80 will now be described. As shown in FIG. 13A, objective lenses 72 and 82 are arranged at destination positions of optical images reflected by the mirror 66. The $\frac{3}{4}''$ ITVs 71 and 81, which have a resolution of 500 × 480 pixels, and on which the optical images are focused, are arranged on the optical axes of the optical images transmitted through the objective lenses 72 and 82. Half mirrors 73 and 83 are arranged on the optical axes of the optical images between the objective lenses 72 and 82 and the ITVs 71 and 81. These half mirrors 73 and 83 reflect light components produced by the reflection optical systems 74 and 84 arranged on these reflection optical paths toward the mirror 66. Upon measurement of the groove positions of the work W, transmission optical images formed by illuminating the work W by the transmission illumination system 60 are reflected by the mirror 66, and are then focused on the ITVs 71 and 81 through the half mirrors 73 and 83. Upon measurement of the positions and areas of processed holes (to be described later), light components produced from the reflection optical systems 74 and 84 are respectively reflected by the half mirrors 73 and 83, are then reflected by the mirror 66, and radiate the work W from the side opposite to the laser light source. In this manner, optical images reflected by the work W are reflected by the mirror 66, and are focused through the corresponding half mirrors 73 and 83. The reflection optical systems 74 and 84 are respectively provided with shutters 75 and 85 at their light output portions. When these shutters 75 and 85 are moved in response to an instruction supplied from the control system 200 through the interface 204, output light components emerge toward the half mirrors 73 and 83.

Figure 13B:
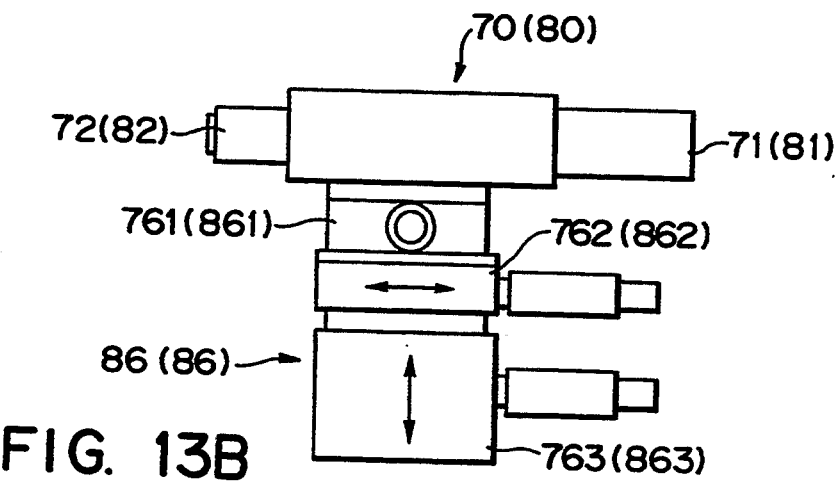
FIG. 13B is a side view showing an adjustment means.

The above-mentioned measurement optical systems 70 and 80 are respectively placed on manual position adjustment mechanisms 76 and 86. As shown in FIG. 13B, the adjustment mechanisms 76 and 86 respectively comprise moving stages 762 and 862 used for adjusting the measurement optical systems 70 and 80 in the optical axis direction, moving stages 763 and 863 used for adjusting the measurement optical systems 70 and 80 in a direction perpendicular to a plane defined by the laser optical axis and the hole aligning direction, and moving stages 761 and 861 used for adjusting the measurement optical systems 70 and 80 in a direction perpendicular to a plane defined by the moving direction of the moving stages 762 and 862, and the moving direction of the moving stages 763 and 863.

Figure 13C:
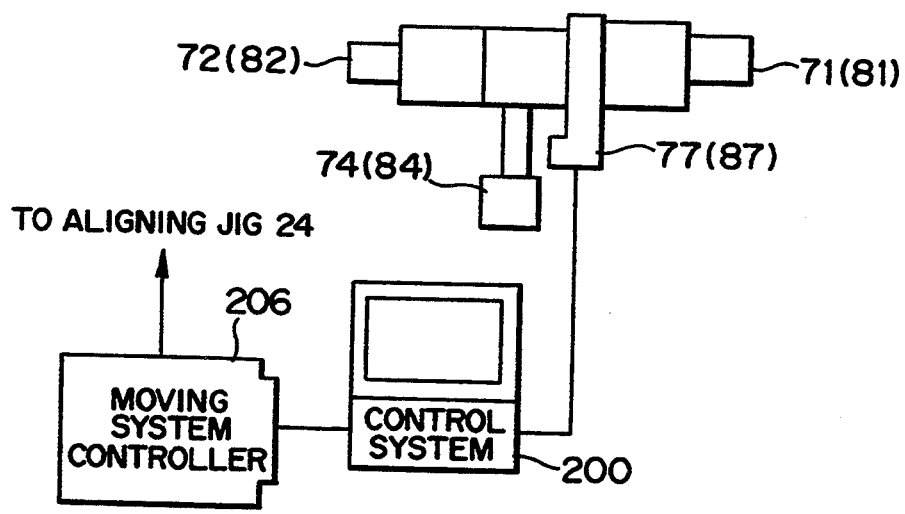
FIG. 13C is a diagram showing an AF circuit of the measurement optical system.

As shown in FIG. 13C, the measurement optical systems 70 and 80 respectively comprise auto-focus units 77 and 87. The auto-focus units 77 and 87 supply pieces of groove position information in the laser optical axis direction to the control system 200 so as to improve aligning precision after the measurement of the groove positions.

In the measurement optical systems 70 and 80, the two optical images of the second groove hole $G_2$ and the 63rd groove hole $G_{63}$ of the work W, which images are reflected by the mirror 66, are focused on the ITVs 71 and 81 at a ×40 magnification and a resolution of 0.33 μm/pel through the objective lenses 72 and 82 and the half mirrors 73 and 83.

Two output signals S1 from the ITVs 71 and 81 are respectively input to the two image processing systems 208 and 209 shown in FIG. 1B. The image processing systems 208 and 209 respectively obtain the two groove positions.

The control sequence of groove position measurement in the image processing systems 208 and 209 will be described below with reference to the flow chart shown in FIG. 14. Since the image processing systems 208 and 209 respectively measure the groove positions of the second groove hole $G_2$ and the 63rd groove hole $G_{63}$ by the same method at the same time, only the image processing system 208 will be described below.

An image signal of an image of the second groove hole $G_2$ displayed on the ITV 71 of the measurement optical system 70 is fetched (S501). In image information fetched on the RAM, a pixel, which is the ith one ($0 \leq i \leq 499$) in the horizontal direction, and is the jth one ($0 \leq j \leq 479$) in the vertical direction, is represented by (i,j), and its pixel data is represented by V(i,j) on an image fetching area having 500 pixels in the horizontal direction, and 480 pixels in the vertical direction. The pixel data V(i,j) represents brightness, and is expressed by 8-bit data ranging between 0 and 255 (0: black, 255: white).

FIG. 15(a) shows the image of the groove hole $G_2$ displayed on the ITV 71. In this image, a line representing the profile of the groove hole $G_2$ is displayed in black. In the image of the groove hole $G_2$, scratches, which may be formed upon molding of the work W, are also displayed, and the fetched image signals also includes components representing the scratches. The image signal of the groove hole $G_2$ is subjected to filtering processing, thereby removing images of the scratches (S502).

The filtering processing will be described below with reference to FIGS. 16(a) to 16(d). In this filtering processing, a case will be described below wherein scratch images are removed from an original image shown in FIG. 16(a).

First, binarization processing of the brightness values of pixels is executed. More specifically, a pixel (i,j) having a brightness value V(i,j) exceeding a predetermined value (slice level) is set to be V(i,j)="1" [i.e., white], and a pixel below the slice level is set to be V(i,j)="0" [i.e., black]. This processing is executed for all the pixels. The slice level is determined in such a manner that the maximum and minimum values of all the pixel data are searched, and are averaged before the binarization processing.

Then, filtering processing is executed. More specifically, in order to execute processing for one pixel (i, j), the brightness values in the abovementioned binarization processing are searched from pixels within a range of i−2 to i+2 and j−2 to j+2 to have the pixel (i,j) as the center. If at least one pixel having the brightness value ="1" is found from the pixels within the searched range, the brightness value of the pixel (i,j) is defined as V(i,j)=1. On the other hand, only when the brightness values of all the pixels within the searched range are "0" the brightness value of the pixel (i,j) is defined as V(i,j)=0.

FIGS. 16(c) and 16(d) show pixels within the range of i−2 to i+2 and j−2 to j+2 for the pixel (i,j). FIG. 16(c) illustrates a state wherein the brightness value of, e.g., a pixel (i+2,j−2)="1". FIG. 16(d) shows a state wherein the brightness values of all the pixels within the searched range are "0". Therefore, upon execution of the above-mentioned filtering processing, the brightness value V(i,j) of the pixel (i,j) is set to be 1 in FIG. 16(c). On the other hand, the brightness value V(i,j) of the pixel (i,j) is set to be 0 in FIG. 16(d).

This filtering processing is executed for pixels within a range of i=2 to 497 and j=2 to 477. Other pixels are set to be 1. Thus, a scratch image or the like, which is not expressed by all black pixels within a range of i=5 pixels and j=5 pixels, can be erased. As a result, a good image from which scratches are removed from an original image can be obtained as shown in FIG. 16(b).

As described above, in this embodiment, since filtering for five pixels is executed, an image consisting of five pixels or less is removed. In general, a line representing a groove hole is expressed by about ten pixels. Thus, an image representing the groove hole will not be removed. FIG. 15(b) shows the image of the groove hole $G_2$ after the filtering processing.

The Y coordinate of a jaw rest portion of the groove hole $G_2$, i.e., of a corner portion defined by the top member $W_2$ and the planar member $W_3$ in FIG. 2A, is obtained (S503). In this case, a sum $V_j$ of brightness values in units of lines is obtained by the following equation for all the pixels (500×480 pixels) of the ITV 71, which displays the image of the groove hole $G_2$ after the filtering processing.

$$V_j = \sum_{i=0}^{j=499} V(i,j)$$

Assume that an 8-bit binary code represents a higher brightness value as it is larger. The graph of FIG. 15(d) shows the sums $V_j$ of the brightness values in units of lines in correspondence with lines. In this graph, the minimum brightness portion corresponds to a portion on the line of the jaw rest portion shown in FIG. 15(b).

FIG. 15(e) is an enlarged view of the minimum brightness portion in the graph of FIG. 15(d).

A minimum value $V_{min}$ in the sums $V_j$ of the brightness values in units of lines is obtained. A predetermined value F (e.g., 10) is added to the minimum value $V_{min}$, and this sum is determined as a slice level. The Y coordinate corresponding to the middle point between two points crossing the graph is determined as a position y1 of the jaw rest portion.

A sum of the position y1 of the jaw rest portion and a predetermined value a is determined as a Y position (Y=y1+a) of the groove hole $G_2$. The value a is preferably about 20 μm if the depth of the groove hole is assumed to be 40 μm.

The Y coordinate y1 determined as the position of the jaw rest portion indicates the center of the line of the jaw rest portion. Since the jaw rest portion actually includes unevenness in an enlarged scale, a predetermined value b (in this embodiment, 6.6 μm corresponding to 20 pixels) is added to the Y coordinate y1 to assume a stable line (Y=y1+b) corresponding to the jaw rest portion (S505).

FIG. 15(f) shows the line y1+b expressed by a brightness value V(i,y+b). In FIG. 15(f), two dark portions (points having low brightness values) appear. These two dark portions correspond to points A and B where the line Y=y1+b crosses lines representing the groove in FIG. 15(c). FIG. 15(g) shows an enlarged view of the dark portion.

In FIG. 15(g), an X coordinate $X_1$ ($X_2$) corresponding to the middle point between two points, i.e., a point where a bright portion changes to a dark portion, and a point where the dark portion changes to a bright portion, is calculated for the two dark portions (S506). An X coordinate corresponding to the middle point (X=($X_1$+$X_2$)/2) of the calculated coordinates $X_1$ and $X_2$ is determined as an X position of the groove hole $G_2$ (S507).

At the obtained groove position, the X position corresponds to the hole aligning direction (X direction), and the Y position corresponds to a direction (Z direction) perpendicular to the laser optical axis and the hole aligning direction. In this manner, the groove positions of the groove holes $G_2$ and $G_{63}$ are simultaneously obtained by the image processing systems 208 and 209.

The groove positions of the groove holes $G_2$ and $G_{63}$ obtained by the image processing systems 208 and 209 as described above are supplied to the control system 200 through a cable S2 (RS232) and an interface 207. The control system 200 calculates shift amounts between the supplied groove position data and the reference values stored in advance in the RAM 202.

In this case, calculations are made for three axes, i.e., the hole aligning direction (X direction), a direction (Z direction) perpendicular to the laser optical axis and the hole aligning direction, and a moving direction (By direction) having the optical axis of laser light as a rotational axis.

The moving amounts for these three axes are calculated by the following equations.

The position of the second groove hole $G_2$ in the X and Z directions is represented by ($X_2,Z_2$), the positions of the 63rd groove hole $G_{63}$ in the X and Z directions is represented by ($X_{63},Z_{63}$), a reference value corresponding to the groove hole $G_2$ is represented by ($x_2,z_2$), and a reference value corresponding to the groove hole $G_{63}$ is represented by ($x_{63},z_{63}$).

A shift amount dZ in the Z direction is given by:

$$dZ = (z_{63}+z_2)/2 - (Z_{63}+Z_2)/2$$

A shift amount dX in the X direction is given by:

$$dX = \{(x_{63}-X_{63})-(x_2-X_2)\}/2$$

If the distance between the optical axes of the position detection mechanisms of the measurement optical systems 70 and 80 is represented by D, the distance between the two reference points indicated by the reference values is expressed by D+$x_2$+$x_{63}$. If $X_2$>>D and $x_{63}$>>D, the distance between the two reference points is D.

Therefore, a shift amount $d\theta_Y$ in the $\theta_Y$ direction is given by:

$$d\theta_Y = \tan^{-1}\frac{(z_{63}-z_2)-(Z_{63}-Z_2)}{D}$$

The shift amounts for the three axes calculated based on the above-mentioned equations are input from the control system 200 to the moving system controller 206 as moving amounts of the work W. The moving system controller 206 drives the moving stage 120 through three drivers corresponding to the three axes on the basis of the calculated moving amounts. In this aligning operation, no adjustment is performed for two axes other than the three axes, i.e., the laser optical axis direction (Y direction), and a rotational direction ($\theta_Z$ direction) having, as a rotational axis, an axis perpendicular to the laser optical axis and the hole aligning direction, since they can fall within given precision. However, in order to further improve precision, moving amounts for the above two axes may be calculated on the basis of the differences between signal values from the auto-focus units 77 and 87 attached to the measurement optical systems 70 and 80, and the reference values stored in the RAM 202. Thus, the calculated moving amounts may be input from the control system 200 to the moving system controller 206, and the moving system controller 206 may move the moving stage 120 through two drivers corresponding to the two axes on the basis of the input moving amounts, thus adjusting the work position in these directions.

After the position of the work W is adjusted, the controller system 200 causes the laser light source 10 to emit light for a predetermined period of time (2 sec) through a cable S3 (RS232) and an interface 203. Thus, predetermined holes can be formed in the work W. Thereafter, calibration for hole positions and hole diameters is performed, as will be described later. The aligning jig 40 is moved to the position of the second work W, and holes are formed in the second work W in the same manner as in the first work W.

After the process of the second work, the aligning jig 40 is moved to the process position of the first work W. The control system 200 drives the vacuum solenoid 402 to release the chucking state of the works W, and supplies an end signal to an auto hand (AH) controller 103 through a cable S4.

The auto hand 100 has supply and delivery fingers. Upon reception of the end signal, the auto hand 100 delivers the processed works using the delivery fingers, and thereafter, supplies non-processed works to the aligning jig 40 of the hole forming process machine using the supply fingers.

Figure 17:
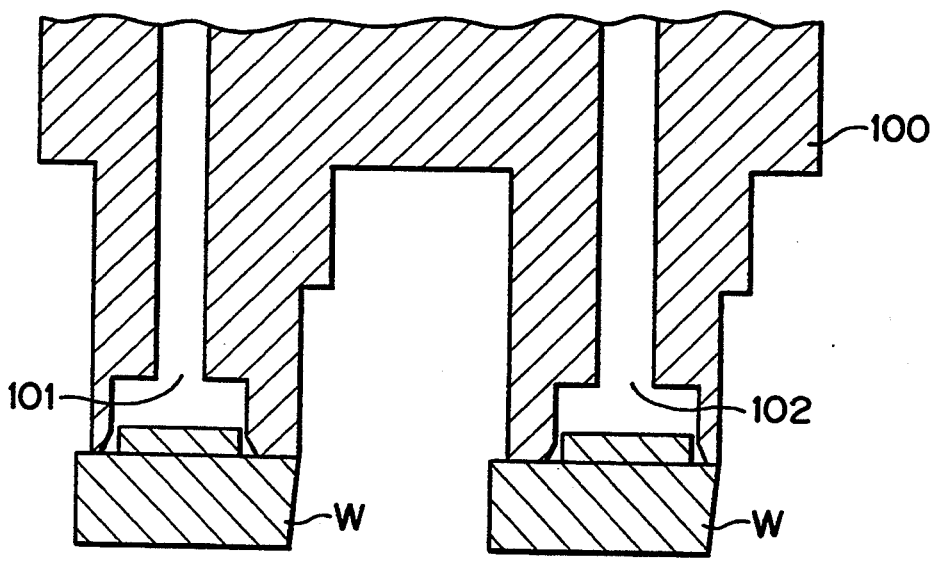
FIG. 17 is a sectional view showing an auto hand.

Each of the supply and delivery fingers of the auto hand 100 of this embodiment comprises two suction ports 101 and 102, as shown in FIG. 17, and can simultaneously supply or deliver two works.

In the hole forming process, since the positional precision of holes serving as ink discharge orifices, and printing performance (especially, variation in discharge direction) have a close relationship therebetween, the printing performance must be controlled to a predetermined value. For this purpose, the positional precision of the formed holes must fall within a predetermined range (e.g., $\pm 2$ $\mu$m).

Figure 18:
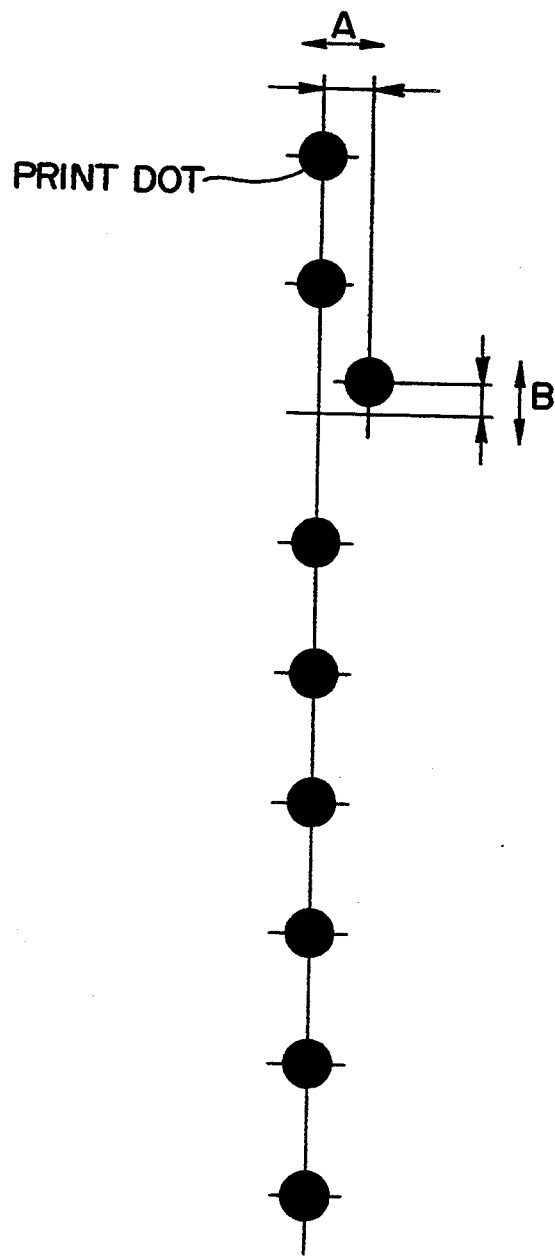
FIG. 18 is a view showing printing dots formed by discharging an ink from an ink-jet head.

As the positional precision, for example, a variation in a direction (a direction of an arrow A) perpendicular to a plane defined between the hole aligning direction and the laser optical axis, a variation in the hole aligning direction (a direction of an arrow B), and a variation of hole diameters must be taken into consideration, as shown in FIG. 18. Note that FIG. 18 shows printed dots formed by discharging an ink from an ink-jet head manufactured by using the work W after the hole forming process.

A product (ink-jet head) manufactured using the work after the hole forming process will be described below with reference to FIGS. 19A and 19B, and FIGS. 20A and 20B.

FIGS. 19A and 19B are respectively a perspective view and a longitudinal sectional view showing an ink-jet head, and FIGS. 20A and 20B are respectively a longitudinal sectional view and a cross-sectional view showing a portion around discharge orifices of the ink-jet head.

As shown in FIGS. 19A and 19B, the ink-jet head is formed by mounting the work W after the hole forming process on a heater board 143. As shown in FIGS. 20A and 20B, heaters $143_n$ (only heaters $143_1$ and $143_2$ are illustrated) are juxtaposed on the heater board 143 in correspondence with the groove holes $G_n$ (only holes $G_1$ and $G_2$ are illustrated) of the work W. The work W is mounted on the heater board 143, so that the groove holes $G_n$ and the heaters $143_n$ coincide with each other.

As shown in FIGS. 19A and 19B, the holes $H_n$ formed in the work W serve as discharge orifices $141_n$, the groove holes $G_n$ communicating with the discharge orifices $141_n$ serve as ink flow paths, and the planar member $W_3$ serves as an orifice plate 142. An ink I is stored in the top plate $W_2$. The heaters $143_n$ are connected to a printing drive unit (not shown) through wiring members $144_n$, as shown in FIG. 20B, when the ink-jet head is assembled in a printing apparatus.

When an ink is discharged from the discharge orifice $141_1$ in this ink-jet head, the heater $143_1$ is driven according to a drive signal from the printing drive unit so as to heat the ink I in the groove hole $G_1$. Thus, as shown in FIG. 20B, a bubble is formed in the groove hole $G_1$, and the ink on the discharge orifice $141_1$ side from the bubble is caused to fly as a liquid droplet. The same applies to other discharge orifices $141_n$.

In order to control the printing performance of the ink-jet head to the predetermined value, a shift amount of the relative positional relationship between the positions of laser light (mask images) after the laser light passes through the mask 30, and the measurement optical systems 70 and 80 must be suppressed. For this purpose, the following calibration method is employed. That is, the positions of the formed holes are measured, and the measured positions are used as reference positions of the groove positions of the next work W to be subjected to hole formation. This calibration method uses the measurement optical systems 70 and 80, the reflection optical systems 74 and 84 attached to the measurement optical systems 70 and 80, and the image processing systems 208 and 209 for performing image processing of the signals S1 from the ITVs 71 and 81.

More specifically, after the hole forming process, the shutters 75 and 85, which shield output light beams from the reflection optical systems 74 and 84, are opened, and the output light beams are respectively reflected by the half mirrors 73 and 83 to propagate through the objective lenses 72 and 82. Thereafter, the output light beams are reflected by the mirror 66 so as to be radiated on the work W. Optical images, which are reflected by the work W and represent the shapes of the formed holes, are focused on the ITVs 71 and 81, and image processing operations of the signals S1 from the ITVs 71 and 81 are executed by the image processing systems 208 and 209, thereby calculating the positions of the formed holes. The calculated values are transferred to the control system 200 through the cable S2 and the interface 207.

The hole position measurement in the image processing systems 208 and 209 will be described below with reference to the flow chart shown in FIG. 21. Since the image processing systems 208 and 209 simultaneously measure the hole positions of the second hole $H_2$ and the 63rd hole $H_{63}$ by the same method, only one image processing system 208 will be described below.

Figure 23:
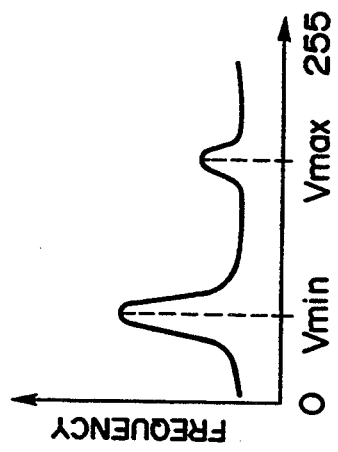
FIG. 23 is a graph showing the frequency of brightness values of pixels of the industrial television when the images of the holes are displayed.
Figure 22:
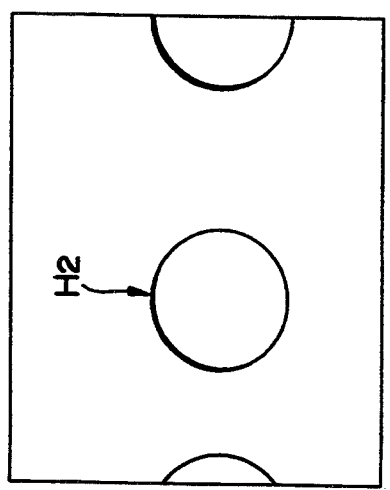
FIG. 22 is a view showing images of holes displayed on the industrial television.

An image signal of an image of the second hole $H_2$ displayed on the ITV 71 of the measurement optical system 70 is fetched (S510). FIG. 22 shows the image of the hole $H_2$ displayed on the ITV 71. The brightness values of all the pixels on the ITV 71 are expressed by 8-bit binary codes (0 to 255) in the same manner as in the above-mentioned measurement of the groove positions, and the frequency of the brightness values, i.e., the number of pixels having the same brightness values is checked within a range of all the pixels (S511). FIG. 23 shows the frequency of the brightness values. In FIG. 23, two peak values representing a dark portion of the hole $H_2$ and the remaining bright portion appear. A portion having a small value ($V_{min}$) represents the dark portion of the hole $H_2$. Maximum and minimum values $V_{max}$ and $V_{min}$ of the brightness values corresponding to the peak values are obtained from this graph (S512). A slice level for binarizing image signals (distinguishing dark and bright portions) is calculated based on the obtained $V_{max}$ and $V_{min}$ using the following equation (S513):

$$\text{Slice Level} = V\text{min} + (V\text{max} - V\text{min}) \times G \quad (G: 0.5)$$

Figure 24:
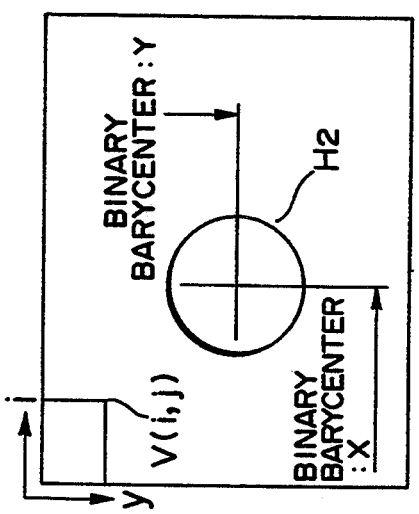
FIG. 24 is a view showing a binary image of a hole formed by binarizing an image signal.

The slice level obtained in this manner is compared with the brightness values of pixels, thereby binarizing image signals (S514). Thus, a portion of the hole $H_2$ can be distinguished from the remaining portion, and the image of the hole $H_2$ can be formed upon binarization of the image signals, as shown in FIG. 24.

In this binary image, X and Y barycenters are calculated as follows (S515):

$$X \text{ barycenter} = \frac{\Sigma(V(i,j) \times i)}{\Sigma(V(i,j))}$$

$$Y \text{ barycenter} = \frac{\Sigma(V(i,j) \times j)}{\Sigma(V(i,j))}$$

The calculated X and Y barycenters are respectively determined as hole positions X and Y of the hole $H_2$ (S517). The hole positions of the two holes $H_2$ and $H_{63}$ are simultaneously obtained in the same manner as in the groove holes. At the obtained hole positions, the hole position X corresponds to the hole aligning direction, and the hole position Y corresponds to the direction perpendicular to the laser optical axis and the hole aligning direction.

The position data of the holes $H_2$ and $H_{63}$ obtained in this manner are transferred to the control system 200.

The control system 200 rewrites two values, i.e., a value corresponding to the hole aligning direction (X direction), and a value corresponding to the direction (Z direction) perpendicular to the laser optical axis and the hole aligning direction, which values are previously stored in the RAM 202, with the values representing the hole positions as reference positions. In the above-mentioned aligning operation of the work W for the three axes, the work is moved based on the differences, as moving amounts, between these two values as reference values (x,z), and the values (X,Z) of the groove positions in the image processing.

The areas of the holes considerably influence the printing performance (especially, the density), and it is important to make constant a variation of the areas, and an average value of the areas in terms of the performance.

Figure 25:
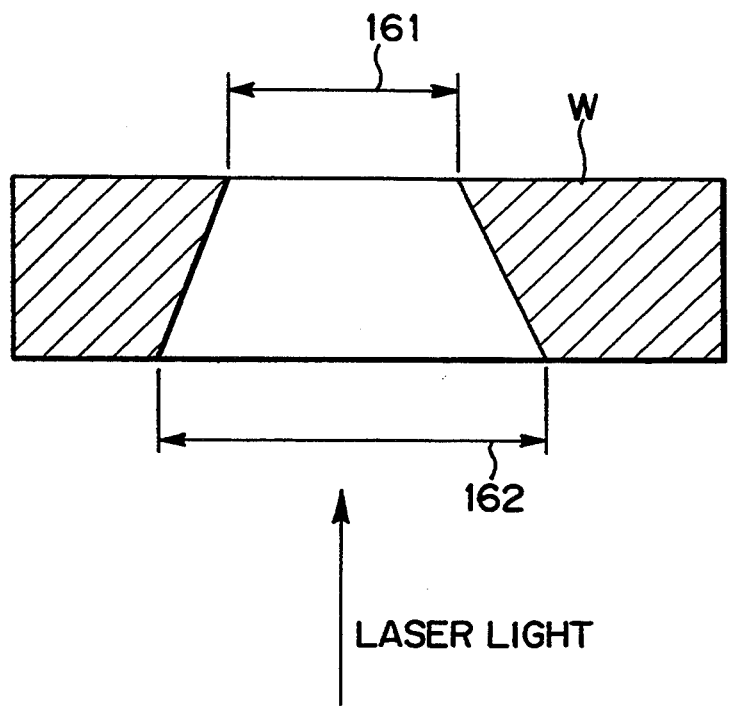
FIG. 25 is a sectional view showing an example of a hole formed by laser light.
Figure 26:
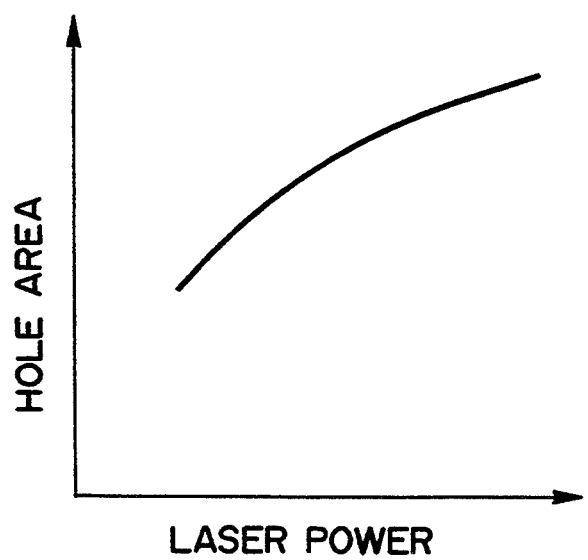
FIG. 26 is a graph showing the relationship between the laser power and the hole area.

As shown in FIG. 25, a hole is formed in the work W to have a tapered shape, so that a diameter on the input side of laser light (input diameter 162) is large, and a diameter on the output side of laser light (output diameter 161) is small. When the laser light power is increased, the taper angle is decreased, and the output diameter 161 is increased while the input diameter 162 is constant. As a result, as shown in the graph of FIG. 26, the hole area is increased. The same applies to a case wherein the number of radiation pulses to a hole formation portion by laser light is changed.

In this manner, the hole diameter, the laser power density, and the number of radiation pulses have a close relationship therebetween. The excimer laser used as the laser light source emits light by pulse discharging. Therefore, a light amount per emission varies. In addition, the excimer laser is largely influenced by the gas concentration, the impurity concentration, and the application voltage in the laser, the service life of the optical systems, contaminations, and the like, resulting in unstable power.

Figure 27A:
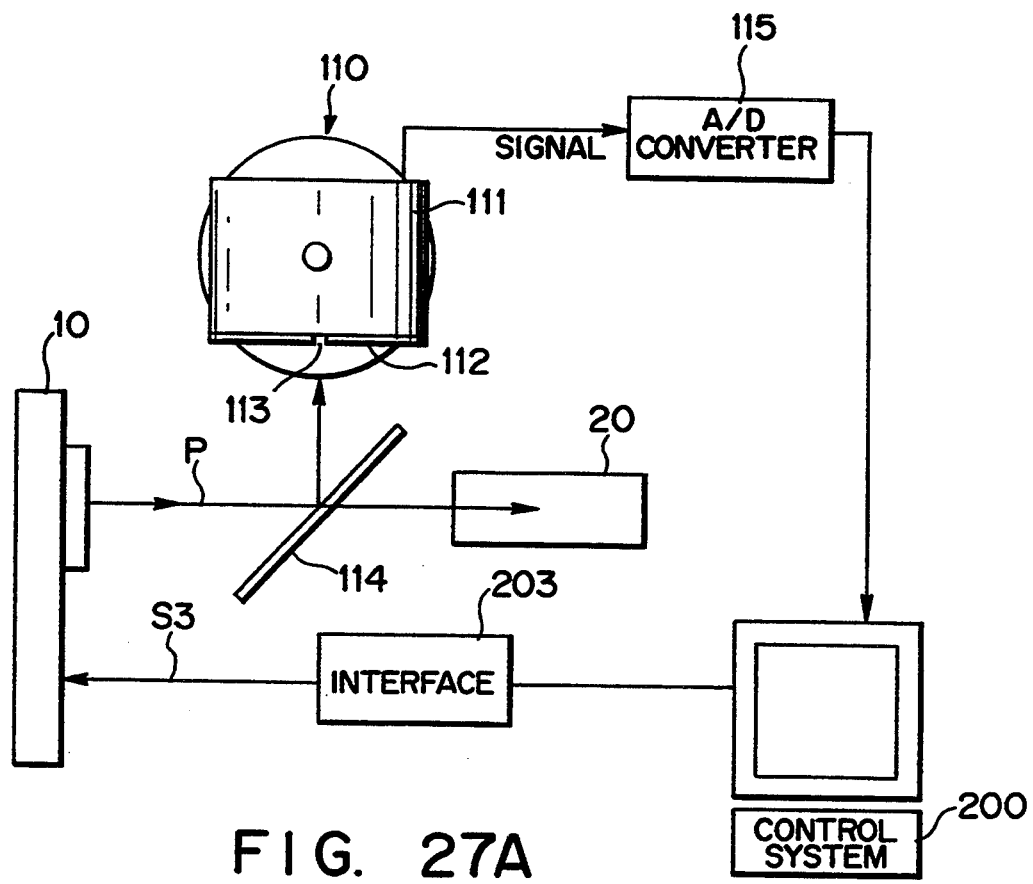
FIG. 27A is a block diagram showing a power sensor.
Figure 27B:
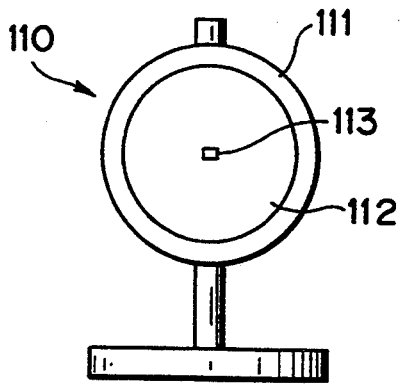
FIG. 27B is a front view showing the power sensor.

As shown in FIGS. 27A and 27B, a power sensor 110 comprising a power meter 111 having an aluminum mask 112, which has a mask hole 113 having a predetermined area, is arranged at the exit of the laser light P, and a beam splitter 114 having a reflectance of several % is arranged in the laser optical path, so that the laser light can be radiated on the aluminum mask 112. Upon laser radiation, light reflected by the beam splitter 114 is received by the power meter 111 through the mask hole 113 of the aluminum mask 112, and the control system 200 changes the application voltage to the laser light source 10 through the interface 203 and the cable S3, so that an output signal S5 from the power meter 111, which signal indicates the power density of the laser light, can be rendered constant.

Figure 27C:
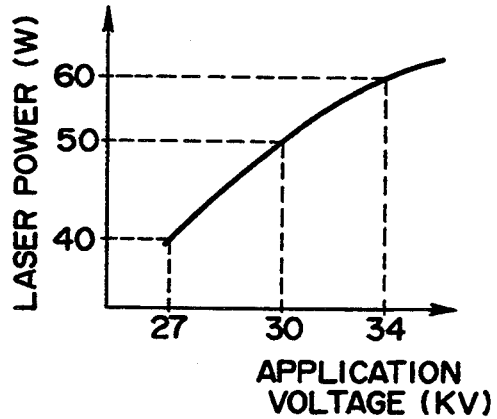
FIG. 27C is a graph showing the relationship between the voltage to be applied to a laser light source and the laser power.

The output signal S5 from the power meter 111 is supplied to the control system 200 through an A/D converter 115. FIG. 27C shows the relationship between the application voltage to the laser light source 10 and the laser power. When the laser power is measured during laser emission upon hole formation, the power density of the laser light P can be kept constant. Therefore, a variation of hole areas can be controlled within a predetermined value. Note that the power meter 111 may comprise either of a light amount measurement type meter or a heat measurement type meter.

Furthermore, as for the hole area, the area of the formed hole may be measured, and the application voltage to the laser light source 10 may be controlled based on the measured area so as to obtain a constant hole area. This area measurement uses the measurement optical systems 70 and 80, the reflection optical systems 74 and 84 attached to the measurement optical systems 70 and 80, the image processing systems 208 and 209 for performing image processing of the signals S1 from the ITVs 71 and 81, and the control system 200. After the hole forming process, the shutters 75 and 85, which shield the output light beams from the reflection optical systems 74 and 84, are opened, thus illuminating the work W from the sides of the objective lenses 72 and 82.

Optical images, which are reflected by the work W, and represent the shapes of formed holes, are focused on the ITVs 71 and 81 attached to the two measurement optical systems 70 and 80, and image processing operations of the signals S1 from these ITVs 71 and 81 are respectively executed by the image processing systems 208 and 209, thereby calculating the areas of the formed holes. The calculated values are transferred to the control system 200 through the cable S2 and the interface 207.

Hole area measurement of the image processing systems 208 and 209 will be described below with reference to the flow chart shown in FIG. 28. Since the image processing systems 208 and 209 simultaneously measure the hole areas of the second hole $H_2$ and the 63rd hole $H_{63}$ by the same method, only one image processing system 208 will be described below.

In order to set start points of area measurement, predetermined values $e_1$ and $e_2$ (in this embodiment, values corresponding to 100 pixels) are subtracted from the hole positions X and Y obtained as described above (S520, S521, S522). In order to set a measurement range, a predetermined value f (in this embodiment, a value corresponding to 200 pixels) is respectively added to the X and Y start points, and the number of pixels indicating a dark portion in the binary image upon measurement of the hole positions is counted within this range (S523). Thus, the number of pixels of the hole portion is obtained, and is multiplied with a value h (in this embodiment, 0.33 $\mu$m $\times$ 0.33 $\mu$m) representing the area of one pixel, thereby obtaining the hole area (S524).

The hole area data of the two holes $H_2$ and $H_{63}$ obtained in this manner are transferred to the control system 200.

The control system 200 determines an application voltage to the laser light source 10 on the basis of a predetermined equation using the transferred hole area data, and transfers it to the laser light source 10 through the cable S3 and the interface 203. In this manner, the application voltage to the laser light source 10 upon process of the next work W is determined. With this method, a uniform hole area can be obtained.

As for the hole area, an illumination light distribution on the mask 30 in the hole forming process is important. If the distribution varies, the hole diameters vary, resulting in printing nonuniformity. Thus, as shown in FIG. 29, a beam splitter 191 is arranged between the field lens 27 and the mask 30, thereby reflecting 10% of the whole light amount in a direction perpendicular to the optical axis. A power measurement device 190 is arranged on the optical axis of the reflected light. In this power measurement device 190, the light-receiving surface of a line sensor 192 is arranged on the optical axis of the reflected light at a position equivalent to the position of the mask 30, and a filter 193 for shielding attenuated light and visible light is arranged on the optical path of the reflected light between the line sensor 192 and the beam splitter 191.

The power measurement device 190 supplies an output from the line sensor 192, which output indicates an illumination light amount radiated on the mask 30, to the control system 200 through an amplifier 194 and an A/D converter 195. Thus, the distribution of light radiated on the first to 64th holes of the mask 30 is measured, and it is checked if the difference between Max and Min values shown in FIG. 30 falls within a predetermined value. If the difference falls outside the predetermined value, the control system 200 displays abnormality on the display 201, thus stopping the hole forming process machine.

Figure 31A:
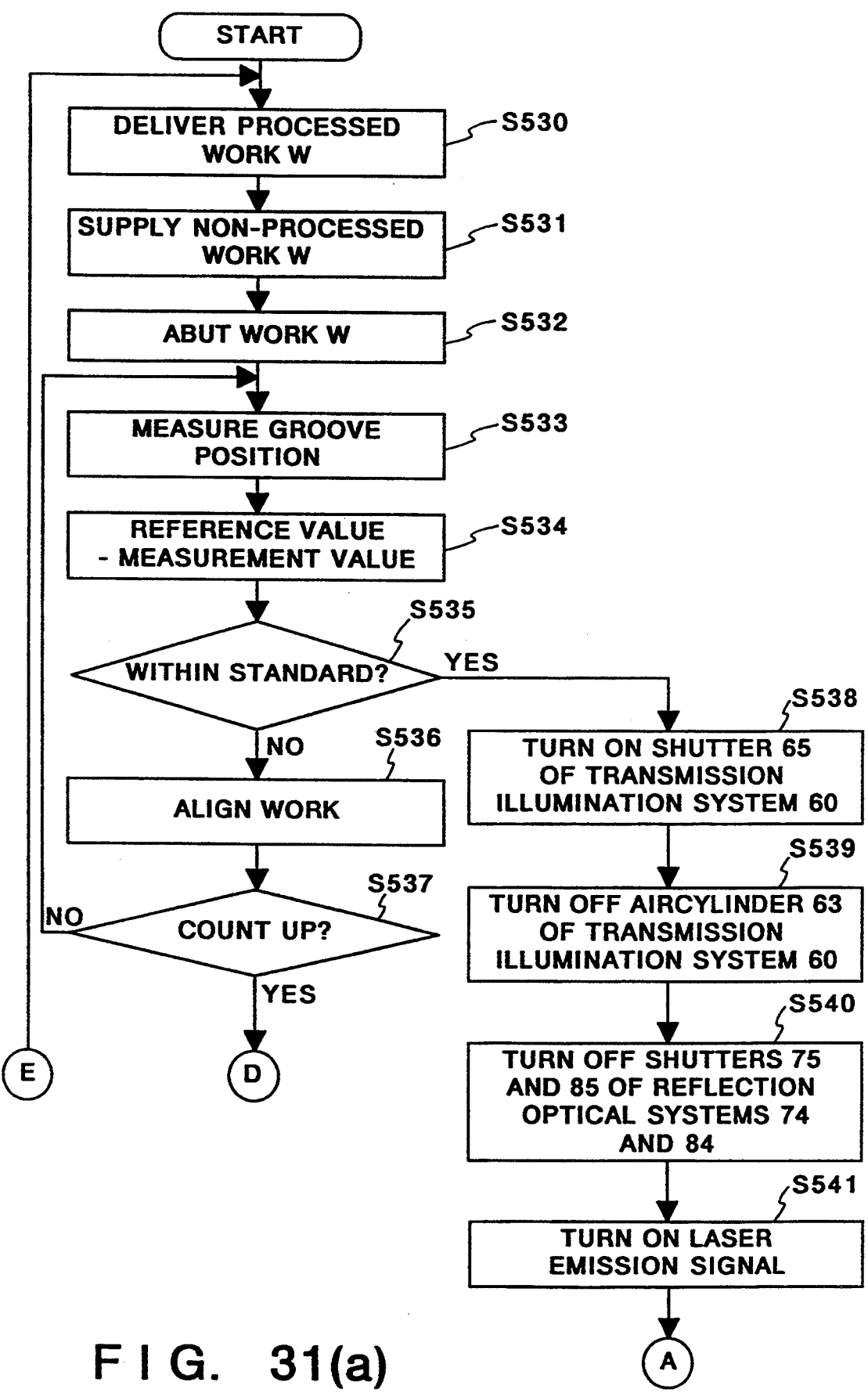
Figure 31B:
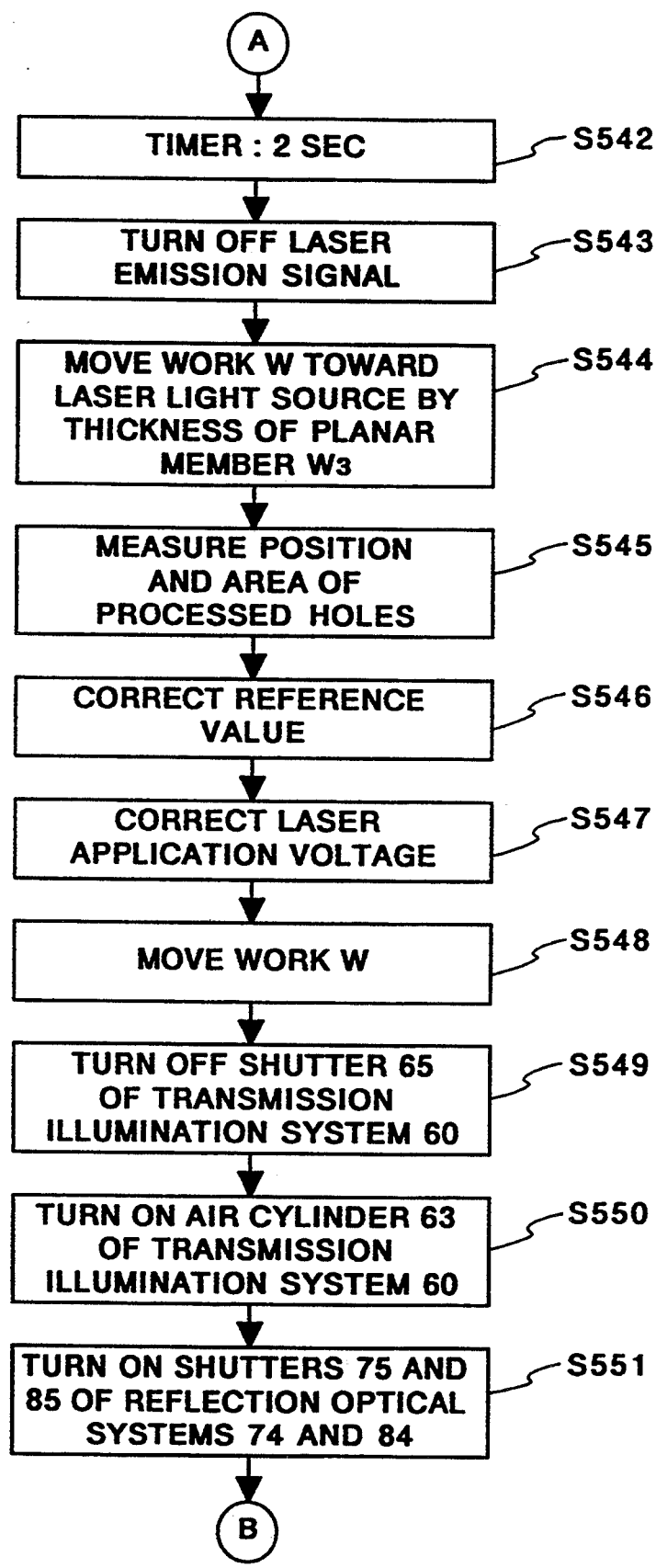
Figure 31D:
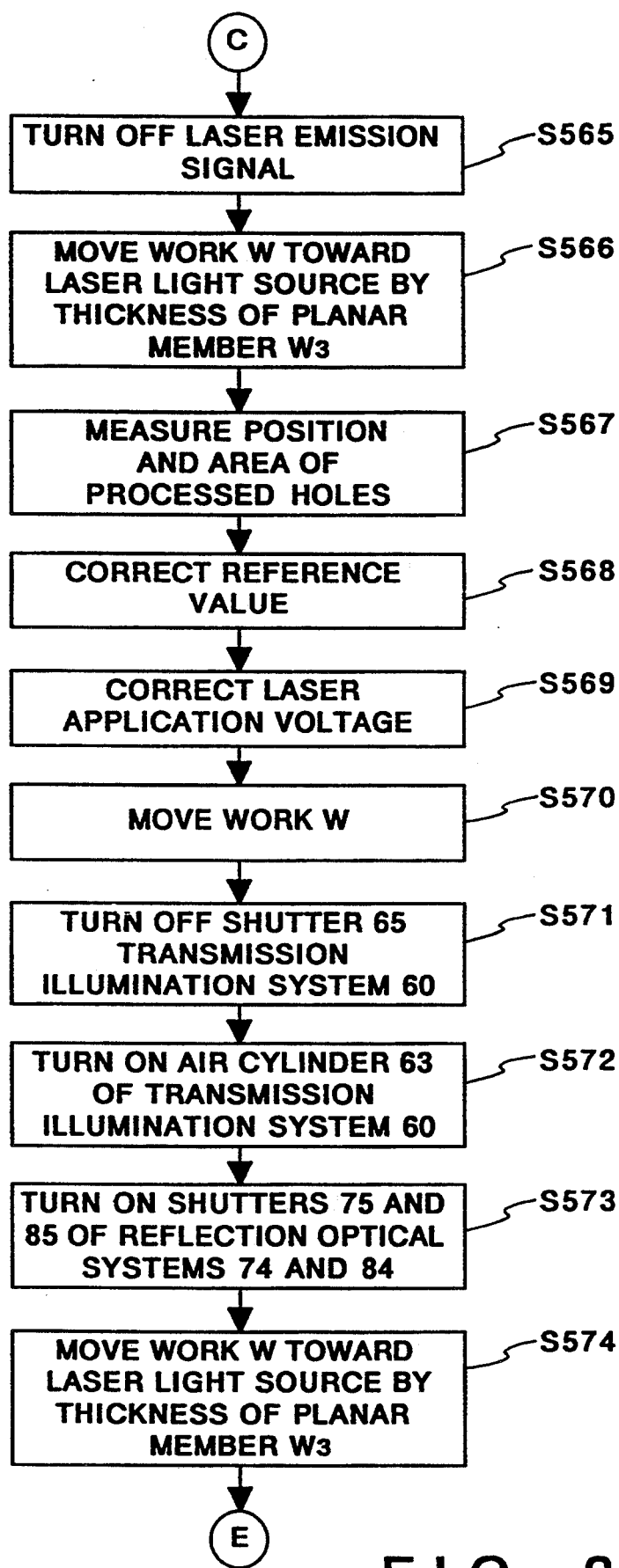

A series of hole forming operations by the laser hole forming process machine of this embodiment will be described below with reference to the flow charts shown in FIGS. 31(a) and 31(b).

If works W subjected to the hole forming process are present on the aligning jig 40, they are delivered by the auto hand 100 (S530). Two, i.e., first and second non-processed works W are supplied onto the aligning jig 40 by the auto hand 100 (S531). When the first and second works W are placed on the aligning jig 40, they are held by vacuum suction by the vacuum holes 401, and are then fixed by the abutting mechanisms 405, 406, and 407 (S532).

Figure 32:
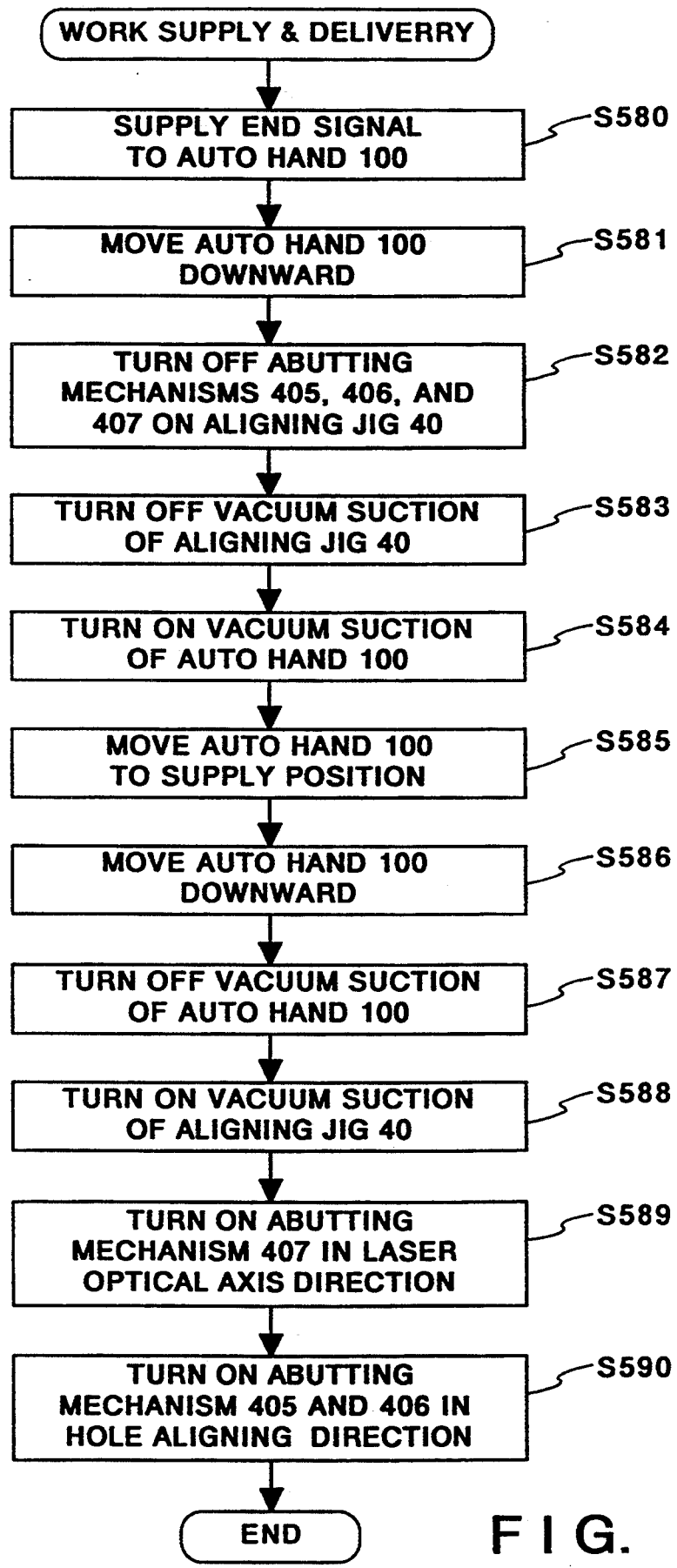
FIG. 32 is a flow chart showing work supply and delivery operations by the auto hand, and a work abutting operation by the aligning jig.

Operations up to the delivery and supply operations of the works W, and abutting and fixing operations of the works W on the aligning jig 40 will be explained below with reference to the flow chart shown in FIG. 32.

Since the auto hand 100 comprises the two sets of fingers, i.e., the supply and delivery fingers, it can simultaneously perform delivery operations of two processed works W, and supply operations of two non-processed works W.

While two non-processed works W, which are previously supplied onto the aligning jig 40, are subjected to hole formation, the auto hand 100 holds two works, i.e., first and second non-processed works W to be subjected to hole formation next by vacuum suction using the supply fingers, and stands by above the aligning jig 40.

When an end signal is input through an AH controller 103 upon completion of hole formation for the two works W on the aligning jig 40 (S580), the auto hand 100 is moved downward to the position of the works W on the aligning jig 40 (S581). At this time, in the aligning jig 40, the abutting/fixing states of the processed works W by the abutting mechanisms 405, 406, and 407 are released (S582), and vacuum suction through the vacuum holes 401 is also released (S584).

Thereafter, the delivery fingers of the auto hand 100 hold the two processed works W by vacuum suction (S584). The supply fingers of the auto hand 100 are then moved to the work supply position on the aligning jig 40, and the auto hand 100 is moved downward (S585, S586). The vacuum chucking states of the first and second non-processed works W by the auto hand 100 are released (S587), thus transferring the first and second works W to the aligning jig 40.

In the aligning jig 40, the first and second works W are held by vacuum suction through the vacuum holes 401 (S588). Furthermore, the abutting mechanism 407 is driven to abut the first and second works W from the laser optical axis direction (S589). Thereafter, the abutting mechanisms 405 and 406 corresponding to the first and second works W are driven to abut the works from the hole aligning direction (S590), thereby fixing the first and second works W supplied on the aligning jig 40.

Figure 14:
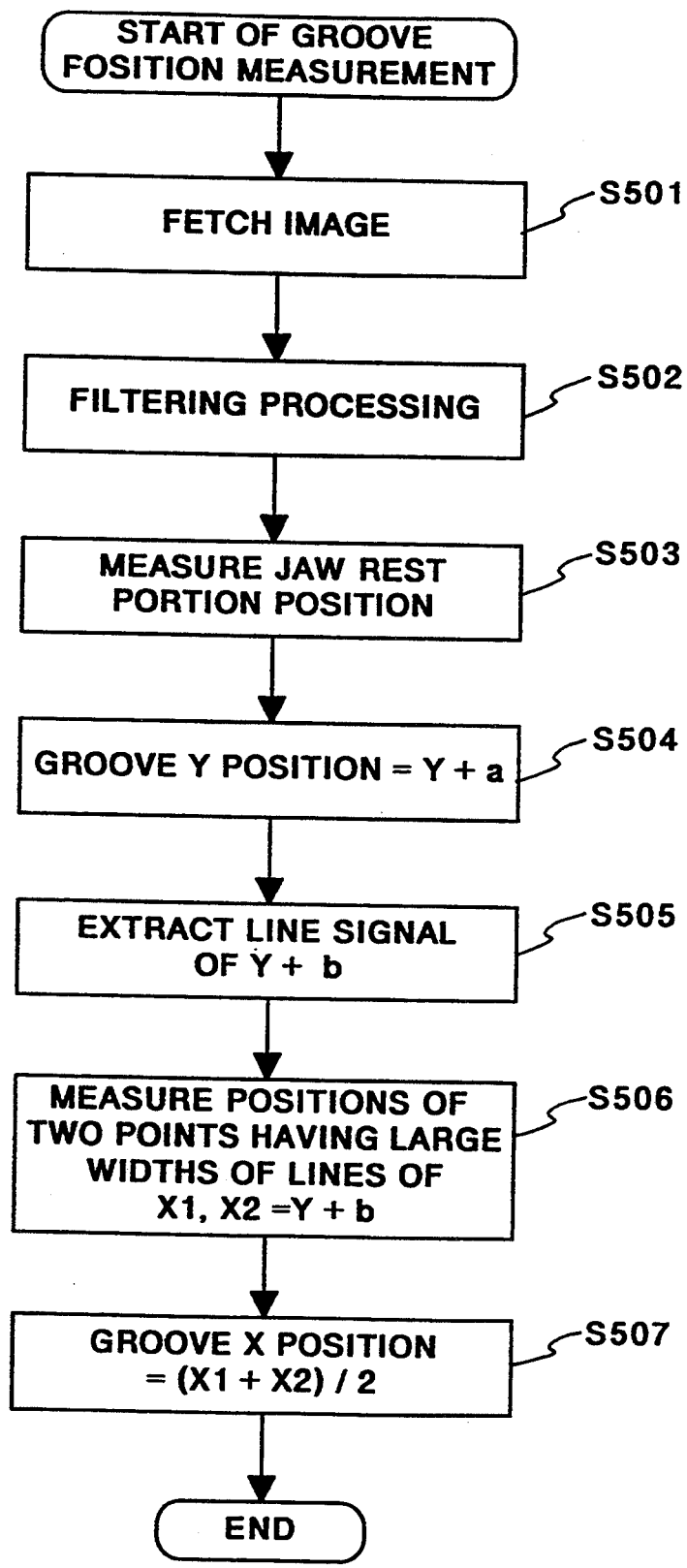
FIG. 14 is a flow chart showing a groove hole position measurement operation of an image processing system.

For the first and second works W fixed as described above, the groove positions of the groove holes $G_2$ and $G_{63}$ of the first work W are measured by the image processing systems 208 and 209 (S533) by the above-described method shown in FIG. 14. Upon completion of measurement of the groove holes $G_2$ and $G_{63}$, the control system 200 compares the two measured groove positions, and reference values representing the corresponding hole positions, thereby determining if the shift amounts of the groove positions fall within predetermined standards (S534, S535). If the shift amounts fall outside the standards, the moving stage 120 is driven through the moving system controller 206 on the basis of the shift amounts, so that the groove positions can fall within the standards of the reference values (S536).

If it is determined in steps S534 and S535 that the groove positions fall outside the standards, the number of times of aligning operations is counted, and an operation in step S533 and subsequent steps is repeated (S537) until the count value reaches a predetermined value (in this embodiment, 10). If the count value exceeds the predetermined value (10), an abnormality is displayed on the display 201 (S558), and the laser hole forming process machine is stopped. The control then waits for a restart instruction (S559).

If it is determined in step S535 that the groove positions fall within the standards, the shutter 65 of the transmission illumination system 60 is driven to shield transmission illumination light $Q_1$, and the air cylinder 63 is driven to cause the 45° mirror 62 to escape from the position on the laser optical axis (S538, S539). The shutters 75 and 85 of the reflection optical systems 74 and 84 are removed from the output optical paths of the reflection optical systems 74 and 84 (S540). Thereafter, the laser light source 10 is caused to emit light (S541), and after an elapse of 2 sec, the light emission is stopped (S542, S543). When the light emission is stopped, hole formation for the first work W is completed.

In order to measure the central positions and areas of the holes formed in the first work W, the moving stage 120 is moved by a distance corresponding to the thickness of the planar member $W_3$ toward the laser light source in the laser optical axis direction (Y direction) (S544). This movement is made for the following reason. Since the hole positions and hole areas are measured by illuminating the first work W with illumination light beams from the reflection optical systems 74 and 84 on the side opposite to the laser light source, the focal points of the hole images on the ITVs 71 and 81 are shifted from the focal points of images of the groove holes formed by illuminating the first work W with the transmission illumination light $Q_1$ from the transmission illumination system 60 by a distance corresponding to the thickness of the planar member $W_3$.

Figure 28:
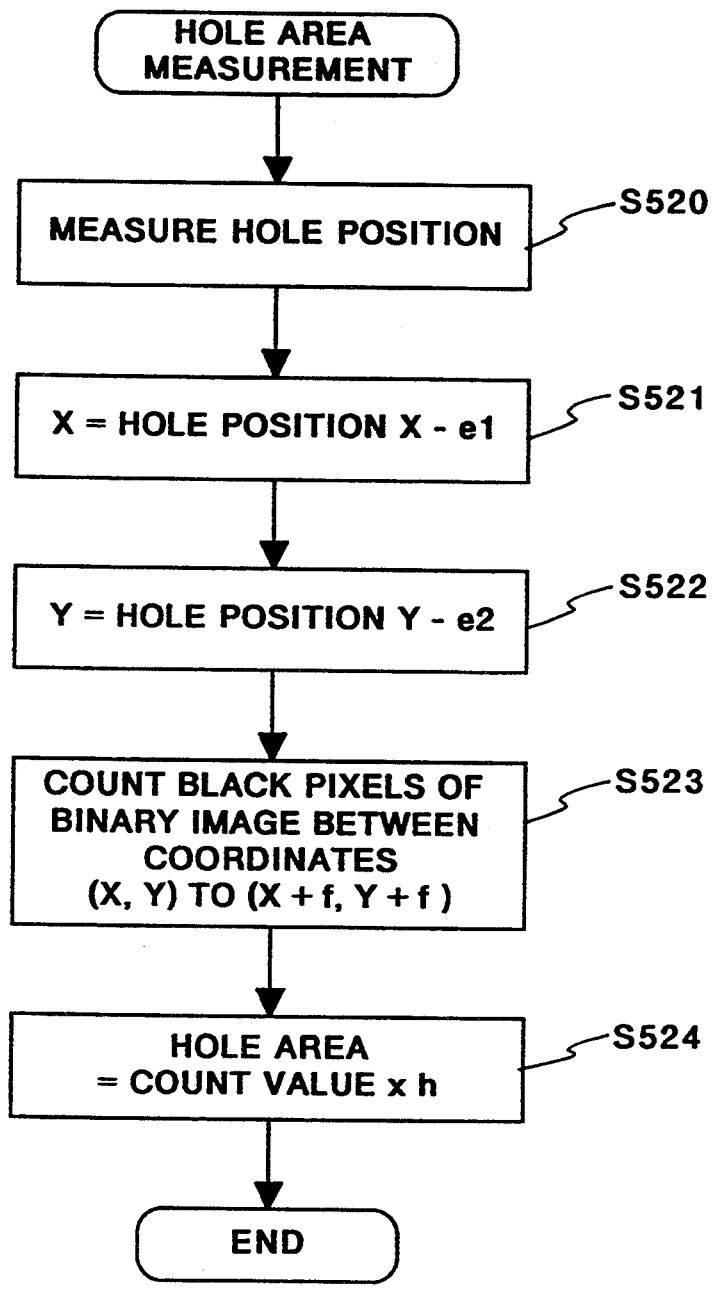
FIG. 28 is a flow chart showing a hole area measurement operation of the image processing system.

Upon completion of movement of the moving stage 120 toward the laser light source, the central positions and areas of the processed holes are measured by the methods shown in FIGS. 21 and 28 (S545). Upon completion of measurement of the central positions and areas, the reference values of the hole positions stored in the RAM 202 are rewritten with the measured central positions of the processed holes, and an application voltage for driving the laser light source 10 is set in accordance with the measured areas of the processed holes (S546, S547).

At this time, the operations for the first work W are completed.

Subsequently, in order to form holes in the second work W, the moving stage 120 is moved in the hole aligning direction (X direction) (S548). Thereafter, in order to measure the groove hole positions of the second work W, the shutter 65 of the transmission illumination system 60 is driven to be removed from the position on the transmission illumination optical path, and the air cylinder 63 is driven to move the 45° mirror 62 of the transmission illumination system 60 onto the laser optical path (S549, S550). Furthermore, the shutter 75 of the reflection optical system 74 is driven to shield the output light from the reflection optical system 74 (S551). The moving stage 120 is moved by a distance corresponding to the thickness of the planar member $W_3$ in the laser optical axis direction (Y direction) (S552). Thereafter, the positions of the groove holes $G_2$ and $G_{63}$ are similarly measured (S553).

The measured groove positions are compared with the reference values stored in the RAM 202 to determine if the shift amounts therebetween fall within the predetermined standards, in the same manner as in the first work W (S554, S555). If the measured groove positions fall outside the standards, the moving stage 120 is moved, so that the groove positions coincide with the central positions of the holes indicated by the reference values (S556). These operations (S553 to S556) are repeated up to a predetermined number of times (10 times) if the measured groove positions cannot fall within the standards (S557). If the number of times of these operations exceeds the predetermined value (10 times), an abnormality is displayed on the display 201 (S558), and the laser hole forming process machine is stopped. The control then waits for a restart instruction (S559).

If the measured groove positions fall within the standards of the reference values, the same operations (S560 to S569) as in the operations (S538 to S547) for the first work W are executed to form holes in the second work W. The positions and areas of the holes are measured to rewrite the reference values in the RAM 202, which values indicate the hole positions, and an application voltage to the laser light source 10 is set in accordance with the hole areas.

At this time, the operations for the second work W are completed.

Thereafter, the moving stage 120 is moved in the hole aligning direction (X direction), thus returning the first work W to the initial position (S570). The shutter 65 of the transmission illumination system 60 is removed from the transmission illumination optical path, and the air cylinder 63 is driven to move the 45° mirror 62 onto the laser optical axis (S571, S572). Furthermore, the shutters 75 and 85 of the reflection optical systems 74 and 84 are driven to shield the output light beams from the reflection optical systems 74 and 84 (S573). Subsequently, the moving stage 120 is moved to a side opposite to the laser light source by a distance corresponding to the thickness of the planar member $W_3$ in the laser optical axis direction (Y direction) (S574). If non-processed works W remain, the operations in step S530 and subsequent steps are repeated to execute the hole forming process.

During the hole forming operations described above, the distribution of the laser light radiated on the mask holes 31 of the mask 30 may be measured using the power measurement device 190 (see FIG. 29).

As the reference values indicating the hole positions, holes may be formed beforehand in a dummy member having the same shape as the work W, and the central positions of the holes may be measured and stored in advance in the RAM 202.

Figure 33:
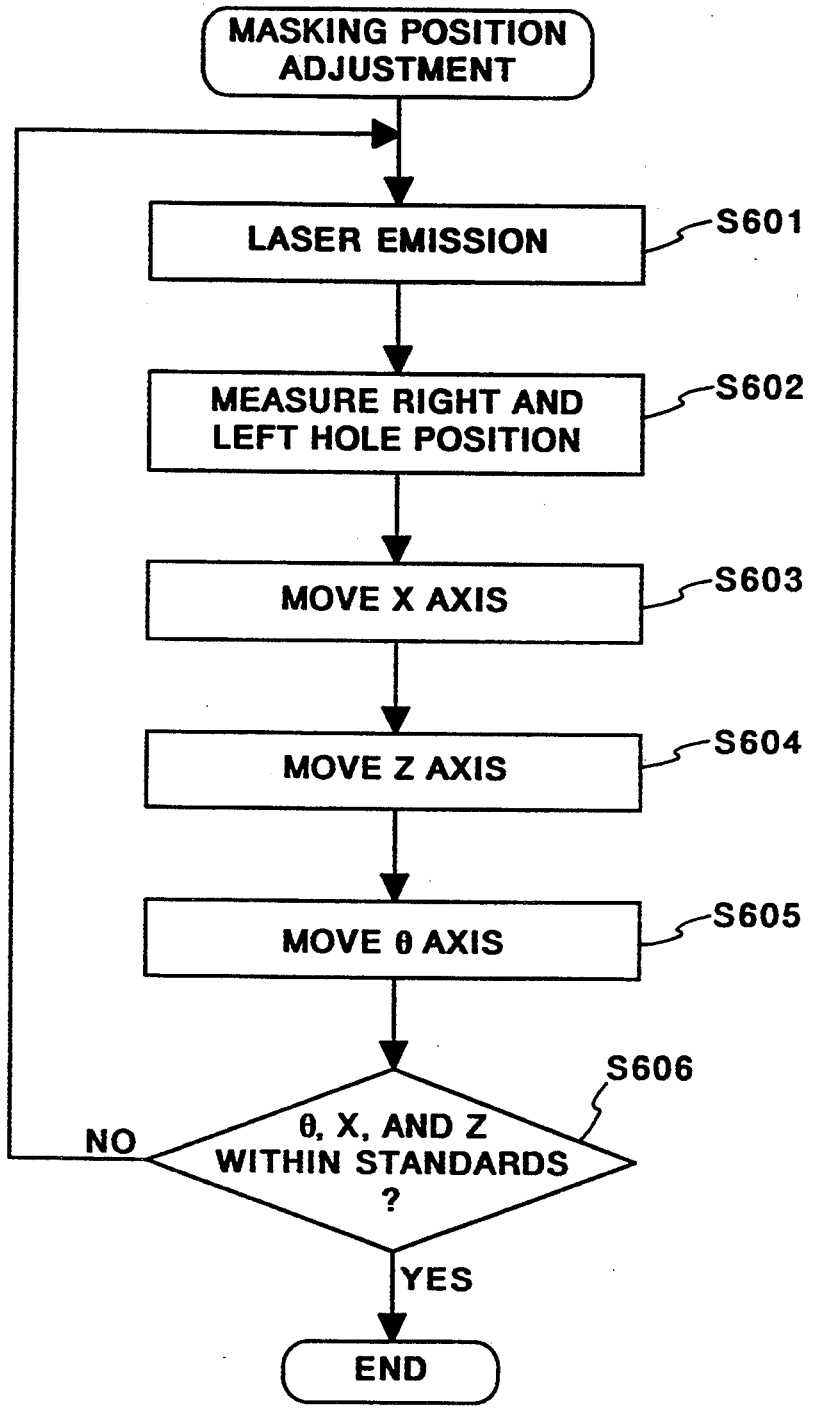
FIG. 33 is a flow chart showing a mask position adjustment sequence when a mask is exchanged.

The aligning sequence by the control system 200 when the mask 30 is exchanged will be described below with reference to the flow chart shown in FIG. 33.

When the mask 30 is exchanged, the control system 200 causes the laser light source 10 to emit the laser light P (S601), thus forming holes in the work W. At this time, the holes are formed in the work W to be shifted according to the difference between the pre- and post-exchange mask positions. For this reason, the positions of the holes $H_2$ and $H_{63}$ formed on the left and right sides of the work W shown in FIG. 12 are checked in the sequence shown in the flow chart of Fig. 21 (S602).

A horizontal shift amount in the measurement optical system 80 is represented by $\Delta x_r$, and a vertical shift amount is represented by $\Delta z_r$. A horizontal shift amount in the measurement optical system 70 is represented by $\Delta x_l$, and a vertical shift amount is represented by $\Delta z_l$. The ratio of the hole pitch on the work W to the hole pitch on the mask 30 is represented by n, and the interval between the right and left holes on the mask 30 is represented by L. Thus, a horizontal position shift amount of the mask 30 is given by:

$$X = -n \cdot (\Delta X_r + \Delta X_l)/2$$

A vertical position shift amount of the mask 30 is given by:

$$z = -n \cdot (\Delta x_r + \Delta x_l)/2$$

A position shift amount in the rotational direction is given by:

$$\theta = -\tan^{-1}\{n \cdot (\Delta z_r - \Delta z_l)/L\}$$

Note that the negative sign is added since an image is reversed by the projection optical system 50 shown in FIG. 1A.

When the center of rotation of the goniostage 321 shown in FIG. 7G is caused to approximately coincide with the center of the hole array formed in the mask 30, the above-mentioned shift amounts can be corrected by moving the X stage 322, the Y stage 324, and the goniostage 321. More specifically, the X axis is moved by $n \cdot (\Delta x_r + \Delta x_l)/2$ (S603), the Z axis is moved by $n \cdot (\Delta z_r + \Delta z_l)/2$ (S604), and the $\theta$ axis is moved by $\tan^{-1}\{n \cdot (\Delta z_r - \Delta z_l)/L\}$ (S605). In this manner, the mask position can be almost corrected to the pre-exchange position. The hole positions may often fall outside the standards depending on the precision of the stages, the aligning precision of the mask holder 33, and the like after a single correction. For this reason, after the stages are moved, the positions of the holes are checked again (S606). Thereafter, the checking operations are repeated until the hole positions fall within the standards.

Figure 34:
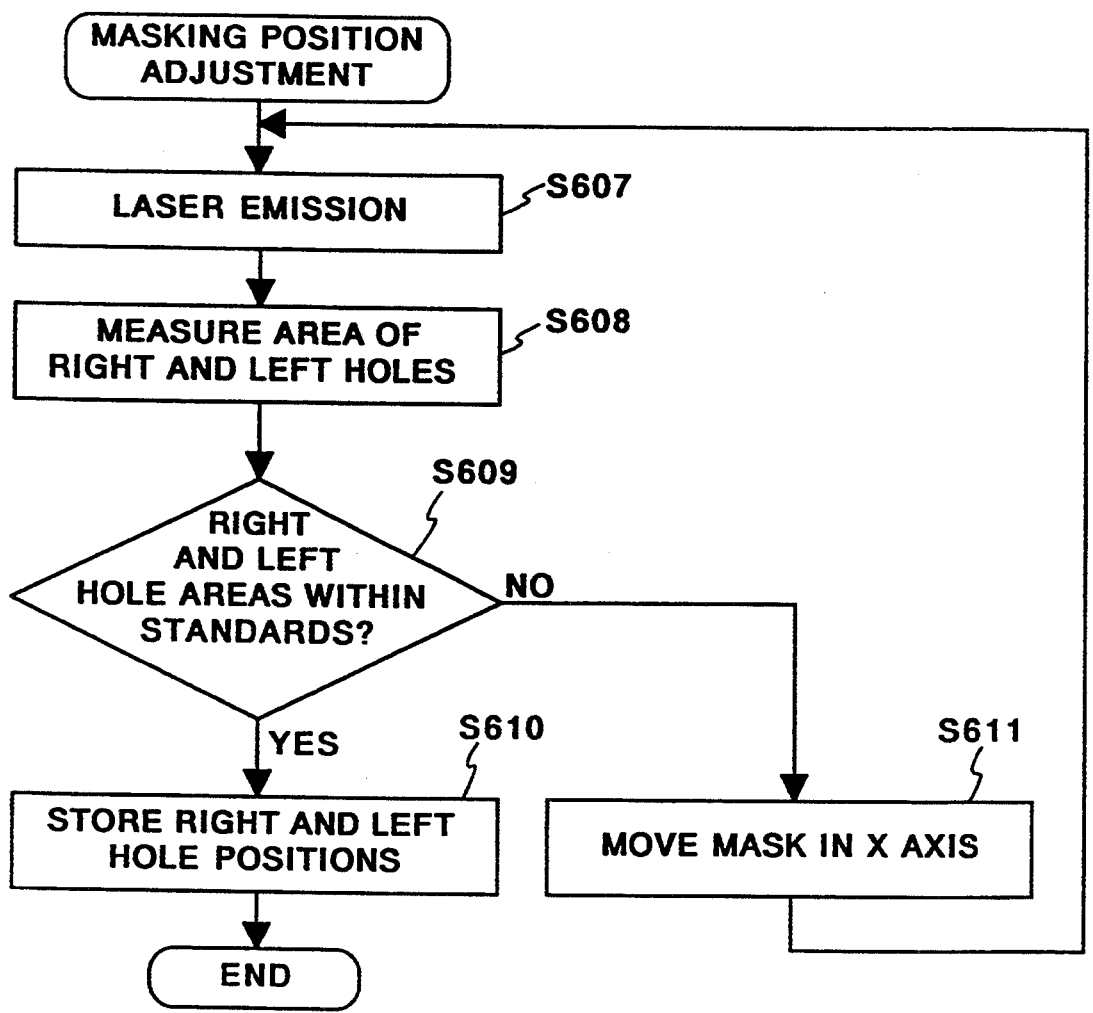
FIG. 34 is a flow chart showing a mask position adjustment sequence when the laser optical axis is shifted.

The position adjustment sequence of the mask 30 by the control system 200 when the axis of the laser light P is shifted upon a maintenance of the laser light source 10 or the projection optical systems, will be described below with reference to the flow chart shown in FIG. 34.

Figure 35:
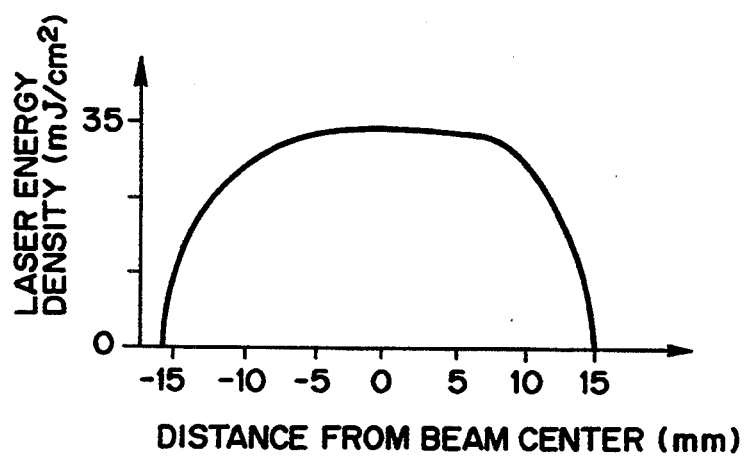
FIG. 35 is a graph showing an intensity distribution of laser light.

The laser light source 10 is caused to emit the laser light P to form holes in the work W (S607). The areas of the holes $H_2$ and $H_{63}$ formed at the left and right sides of the work W are measured by the measurement optical systems 70 and 80 according to the sequence shown in the flow chart of FIG. 28 (S608). FIG. 26 shows the relationship between the laser light intensity and the area of a hole formed in the work W. FIG. 35 shows the energy intensity distribution of the laser light P on the mask 30 in the process. From these graphs, it can be estimated that the axis of the laser light P is offset to one, having a larger area, of the holes $H_2$ and $H_{63}$ formed at the left and right sides of the work W.

Thus, the hole areas of the holes $H_2$ and $H_{63}$ are compared with each other to check if the comparison result falls within a predetermined range (S609). Thereafter, if the hole areas fatal within the predetermined range, the positions of the holes $H_2$ and $H_{63}$ formed in the work W are stored (S610), thus ending the control sequence. However, if the comparison result falls outside the predetermined range, the mask 30 is moved by a predetermined amount (S611). The abovementioned operations are repeated until the comparison result falls within the predetermined range.

Upon execution of the above-mentioned position adjustment of the mask 30, the position of the mask 30 can be aligned in the optical path of the laser light P to be balanced well. At this time, the mask 30 is set at a position different from that before adjustment, and the positions of holes formed in a work W are shifted, as a matter of course. For this reason, after the position adjustment of the mask 30, the work W is moved according to the present positions of the holes $H_2$ and $H_{63}$ stored in step S610 in the flow chart of FIG. 34. Thus, the same process as that before the axis of the laser light P is shifted can be performed for the work W.

The above-mentioned position adjustment of the mask 30 is performed when the mask is exchanged or when the laser optical axis is shifted. In addition to these cases, a variation in atmosphere, which may cause a position shift, such as a temperature drift or vibration, is detected, and when the variation amount exceeds a predetermined amount, the position adjustment may be automatically executed. Alternatively, the position adjustment may be executed at predetermined time intervals, as a matter of course.

The present invention is not limited to the arrangement of the above embodiment, and various changes and modifications may be made within the spirit and scope of the invention.

Figure 36:
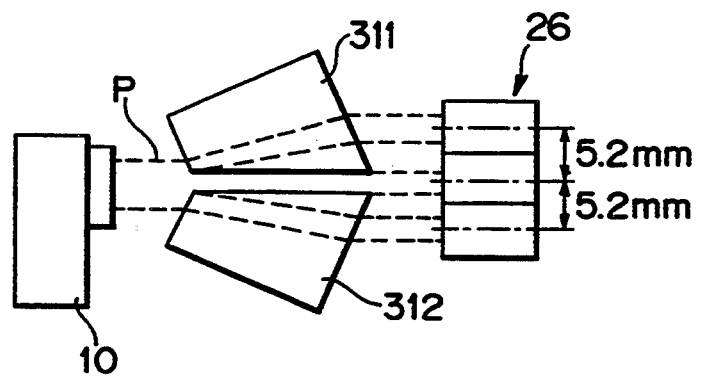
FIG. 36 is a view showing the second embodiment of an illumination optical system.

In the above embodiment, the lenses 21 to 25 in the illumination optical system 20 are used to guide laser light to the fly-eye lens 26. However, the present invention is not limited to this arrangement. The above optical system may be modified, as shown in Fig. 36 of another embodiment.

In this embodiment, prisms 311 and 312 for splitting laser light P emitted from a laser light source 10 into three beams in a direction perpendicular to a plane defined by the laser optical axis and a hole aligning direction, are arranged. The three beams must be split at a predetermined interval in the direction perpendicular to the plane so as to coincide with the optical axes of a fly-eye lens 26. Since the fly-eye lens 26 is constituted by combining $6\phi$ lenses, the optical axes of the lens 26 are separated by 5.2 mm in the direction perpendicular to the plane. Since the laser light has a spot size of 6 mm in the direction perpendicular to the plane, it can be split into three beams by 2 mm. Since the beams are originally separated by 2 mm, the beams must be further separated by 3.2 mm by the prisms 311 and 312.

Figure 37:
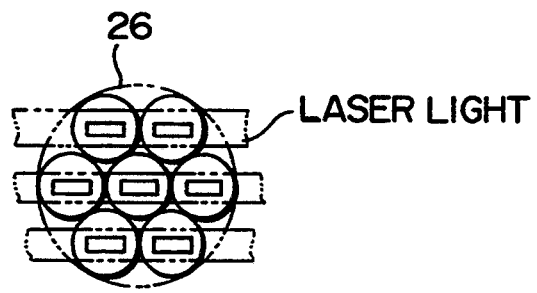
FIG. 37 is a view showing an example of laser light incident on a fly-eye lens of the illumination optical system.

In each of the prisms 311 and 312, the input and output surfaces of laser light are formed to be parallel to each other. As a result, the prisms 311 and 312 split the laser light into three beams to have a beam interval of 5.2 mm when they are rotated in the rotational direction having the rotational axis in the aligning direction of mask holes 31. FIG. 37 shows beams incident on the fly-eye lens 26 when the above-mentioned prisms 311 and 312 are arranged.

Figure 38:
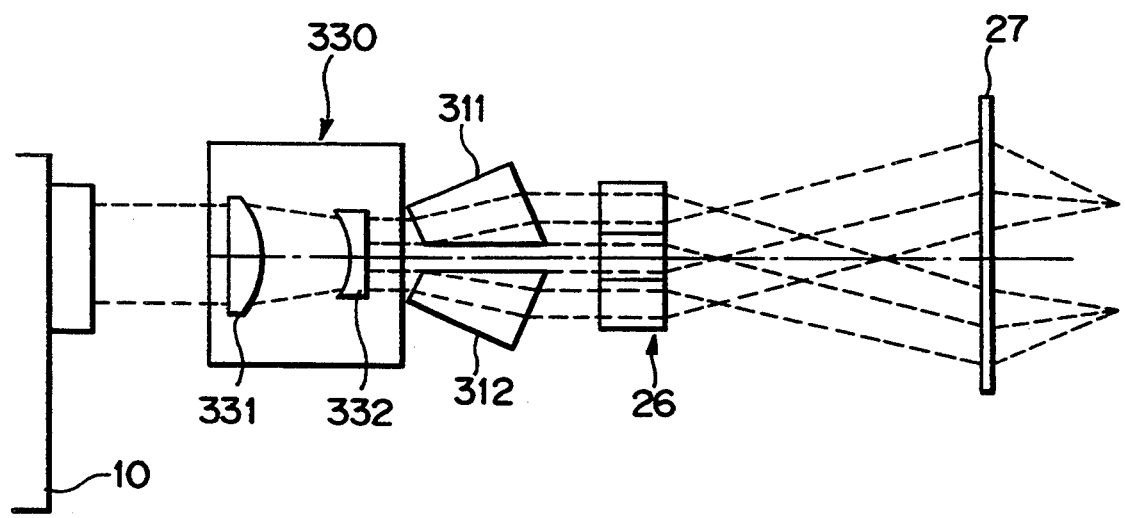
FIG. 38 is a view showing the third embodiment of an illumination optical system.

A compression optical system 330, including convex and concave lenses 331 and 332, for compressing a beam pattern may be arranged on the optical axis between the prisms 311 and 312, as shown in FIG. 38 as still another embodiment.

In the above embodiment, the excimer laser used as the laser light source 10 is a laser capable of oscillating ultraviolet rays, and have advantages of a high-intensity energy output, good monochromaticity and directivity, and short pulse oscillation. In addition to these advantages, the excimer laser can increase an energy density when laser light is focused by a lens. More specifically, an excimer laser oscillator can oscillate short ultraviolet pulses (15 to 35 ns) by exciting a gas mixture of a rare gas and halogen by discharging, and often employs a Kr-F laser, an Xe-Cl laser, an Ar-F laser, and the like. The oscillation energy of these lasers is several hundreds of 100 mj/pulse, and the repetition frequency of pulses is 30 to 1,000 Hz. In this manner, when high-luminance short ultraviolet pulses are radiated on the surface of a polymer resin, a so-called "APD (ABLATIVE PHOTO DECOMPOSITION)" process occurs.

In this process, the radiated portion is instantaneously decomposed and scattered with plasma emission and shock noise. Thus, the hole forming process of a polymer resin can be attained.

This process makes a clear difference from a hole forming process using another laser, e.g., a $CO_2$ laser for emitting infrared rays. For example, when laser light is radiated on a polyimide (PI) film using an excimer laser (Kr-F laser), since the light absorption wavelength of the PI film is present in a UV region, holes can be satisfactorily formed. However, when a conventional YAG laser, whose wavelength is not present in the UV region, is used, the edges of holes are undesirably roughened. On the other hand, when a $CO_2$ laser is used, craters are undesirably formed around holes.

Note that a metal (e.g., SUS), a non-transparent ceramic, Si, and the like are not influenced by radiation of laser light from an excimer laser in the air. Therefore, these materials can be used as those for the mask 30.

The results in the laser hole forming process machine using the excimer laser will be exemplified below.

(EXAMPLE 1)

In a work W used herein, groove holes G were formed in a top member $W_2$ to have a pitch of 70.5 $\mu m$, a width of 4.3 $\mu m$, and a height of 45 $\mu m$. When discharge orifices each having a diameter of 31 $\mu m$ were formed in a planar member $W_3$ using the INDEX200K (available from Lumonix Corp.) as the excimer laser under the conditions of a laser output=250 mj/pulse, a repetition frequency=200 Hz, and an oscillation time=2 sec, results shown in Table 1 below were obtained. The thickness of the planar member $W_3$ was 40 to 45 $\mu m$, and its material was polysulfone. For the purpose of comparison, the difference in process precision from a conventional machine is also listed.

TABLE 1

|  | Orific Area (Average of 10 Heads) (64 Orifices/head) | Hole Shape |
| --- | --- | --- |
| Example 1 | 750 $\mu m^2$ ± 50 $\mu m^2$ | Good |
| Prior Art | 750 $\mu m^2$ ± 150 $\mu m^2$ | Fair |

As can be apparent from Table 1, when hole formation is performed using the laser hole forming process machine of this example, a variation of orifice areas, and hole shapes can be greatly improved as compared to a conventional machine. This fact can also improve the performance of an ink-jet head manufactured by the laser hole forming process machine of this example. More specifically, the discharge amount and direction of ink droplets can be uniform, and clear characters and figures free from blurring can be printed.

[Effect of the Invention]

Since the present invention has the arrangement described above, the following effects can be provided.

In either of apparatuses described in claims 1 and 2, the position adjustment of a mask can be executed without requiring a manual operation. Therefore, an adjustment time when a mask is exchanged or when the mask position must be re-adjusted can be greatly reduced, resulting in high productivity.

As many apparently widely different embodiments of the present invention can be made without departing from the spirit and scope thereof, it is to be understood that the invention is not limited to the specific embodiments thereof except as defined in the appended claims.

What is claimed is:

1. A laser process apparatus for making holes in a workpiece, comprising:
    a laser light source emitting a laser light;
    optical converting means for converting the laser light from said laser light source to laser beams suitable to make holes in the workpiece;
    workpiece holding means for holding the workpiece at a processing position where the holes are made in the workpiece, said workpiece holding means having an adjusting mechanism for adjusting the processing position;
    a mask for processing the laser light into laser beams, shapes of which correspond to shapes of the holes; and
    mask adjusting means for adjusting the position of said mask.

2. The apparatus according to claim 1, wherein the workpiece is an ink injection member having a plurality of ink passages for injecting ink and forming an image on a recording media, and said workpiece holding means holds the workpiece slantingly so that central axes of the ink passages cross optical axes of the laser beams.

3. The apparatus according to claim 1, further comprising:
    measuring means for measuring a position of a predetermined portion of the workpiece by processing an image of the workpiece; and
    control means for controlling said adjusting mechanism according to the position of the predetermined portion measured by said measuring means.

4. The apparatus according to claim 3, wherein the workpiece is an ink injection member having a plurality of ink passages for injecting ink and forming an image on a recording media, and said workpiece holding means holds the workpiece slantingly so that central axes of the ink passages cross optical axes of the laser beams.

5. The apparatus according to claim 1, wherein said optical converting means has light beam separating means for separating the laser light into a plurality of laser beams.

6. The apparatus according to claim 5, wherein the workpiece is an ink injection member having a plurality of ink passages for injecting ink and forming an image on a recording media, and said workpiece holding means holds the workpiece slantingly so that central axes of the ink passages cross optical axes of the laser beams.

7. The apparatus according to claim 5, further comprising:
    measuring means for measuring a position of a predetermined portion of the workpiece by processing an image of the workpiece; and
    control means for controlling said adjusting mechanism according to the position of the predetermined portion measured by said measuring means.

8. The apparatus according to claim 7, wherein the workpiece is an ink injection member having a plurality of ink passages for injecting ink and forming an image on a recording media, and said workpiece holding means holds the workpiece slantingly so that central axes of the ink passages cross optical axes of the laser beams.

9. The apparatus according to claim 1, further comprising power density adjusting means for adjusting a power density of the laser beam.

10. The apparatus according to claim 9, wherein the workpiece is an ink injection member having a plurality of ink passages for injecting ink and forming an image on a recording media, and said workpiece holding means holds the workpiece slantingly so that central axes of the ink passages cross optical axes of the laser beams.

11. The apparatus according to claim 9, further comprising:
measuring means for measuring a position of a predetermined portion of the workpiece by processing an image of the workpiece; and
control means for controlling said adjusting mechanism according to the position of the predetermined portion measured by said measuring means.

12. The apparatus according to claim 11, wherein the workpiece is an ink injection member having a plurality of ink passages for injecting ink and forming an image on a recording media, and said workpiece holding means holds the workpiece slantingly so that central axes of the ink passages cross optical axes of the laser beams.

13. The apparatus according to claim 9, wherein said power density adjusting means has power adjusting means for measuring diameters of the holes made on the workpiece and adjusting a power of the laser light source according to the diameters of the holes.

14. The apparatus according to claim 13, wherein the workpiece is an ink injection member having a plurality of ink passages for injecting ink and forming an image on a recording media, and workpiece holding means holds the workpiece slantingly so that central axes of the ink passages cross optical axes of the laser beams.

15. The apparatus according to claim 13, further comprising:
measuring means for measuring a position of a predetermined portion of the workpiece by processing an image of the workpiece; and
control means for controlling said adjusting mechanism according to the position of the predetermined portion measured by said measuring means.

16. The apparatus according to claim 15, wherein the workpiece is an ink injection member having a plurality of ink passages for injecting ink and forming an image on a recording media, and said workpiece holding means holds the workpiece slantingly so that central axes of the ink passages cross optical axes of the laser beam.

17. The apparatus according to claim 9, wherein said power density adjusting means has distribution adjusting means for measuring a distribution of the laser beam irradiated on the plurality of holes formed on said mask and adjusting the distribution of the laser beams.

18. The apparatus according to claim 17, wherein the workpiece is an ink injection member having a plurality of ink passages for injecting ink and forming an image on a recording media, and said workpiece holding means holds the workpiece slantingly so that central axes of the ink passages cross optical axes of the laser beams.

19. The apparatus according to claim 17, further comprising:
measuring means for measuring a position of a predetermined portion of the workpiece by processing an image of the workpiece; and
control means for controlling said adjusting mechanism according to the position of the predetermined portion measured by said measuring means.

20. The apparatus according to claim 19, wherein the workpiece is an ink injection member having a plurality of ink passages for injecting ink and forming an image on a recording medium, and workpiece holding means holds the workpiece slantingly so that central axes of the ink passages cross optical axes of the laser beams.

21. A laser process apparatus for making holes in a workpiece by a laser beam irradiated by a laser light source, comprising:
workpiece holding means for holding the workpiece in alignment with an optical axis of the laser beam;
a first mask for processing a shape of the laser beam into a shape to be irradiated on the workpiece; and
mask position adjusting means for adjusting a position of said first mask to adjust a position of the laser beams irradiating the workpiece, said mask position adjusting means having a mask holding member for holding the first mask on the optical axis of the laser beam, a moving mechanism for moving the mask holding member in a parallel direction and a vertical direction to the optical axis, and cooling means for cooling the first mask.

22. The apparatus according to claim 21, wherein the workpiece is an ink injection member having a plurality of ink passages for injecting ink and forming an image on a recording media, and said workpiece holding means holds the workpiece slantingly so that central axes of the ink passages cross optical axes of the laser beams.

23. The apparatus according to claim 21, further comprising a second mask for adjusting a light amount irradiated on the first mask.

24. The apparatus according to claim 23, wherein the workpiece is an ink injection member having a plurality of ink passages for injecting ink and forming an image on a recording media, and said workpiece holding means holds the workpiece slantingly so that central axes of the ink passages cross optical axes of the laser beams.

25. A laser process apparatus for making holes in a workpiece by a laser beam irradiated by a laser light source, comprising:
optical converting means for converting a laser light emitted from the laser light source to a laser beam suitable to make holes in the workpiece;
a mask for processing a shape of the laser beam to a shape to be irradiated on the workpiece; and
holding means for holding the workpiece in alignment with an optical axis of the laser beam, said holding means having a moving mechanism for moving the workpiece in a parallel direction and a vertical direction to the optical axis, and control means for measuring positions of a predetermined plurality of points on the workpiece and controlling said moving mechanism so as to adjust a position of the workpiece according to the measured positions of the points.

26. The apparatus according to claim 25, wherein the workpiece is an ink injection member having a plurality of ink passages for injecting ink and forming an image on a recording media, and said holding means holds the workpiece slantingly so that central axes of the ink passages cross optical axes of the laser beam.

27. A laser process method for processing a workpiece, comprising the steps of:

adjusting the workpiece to align with an optical axis of a laser beam emitted from a laser light source;

converting the laser beam from the laser light source to laser beams suitable to process the workpiece;

adjusting a position of a mask through which the laser beams are irradiated at processing portions of the workpiece;

adjusting power densities of the laser beams; and processing the workpiece by the laser beams irradiated on the workpiece through the mask.

28. The method according to claim 27, wherein the workpiece adjusting step has substeps of measuring a position of a predetermined portion of the workpiece and adjusting a position of the workpiece according to the position of the measured predetermined portion.

29. The method according to claim 28, wherein the workpiece is an ink injection member having a plurality of ink passages for injecting ink, and positions of predetermined two ink passages are measured.

30. The method according to claim 27, wherein the laser beam is separated into a plurality of laser beams at the converting step.

31. The method according to claim 27, wherein the power density adjusting step has substeps of measuring areas of the processed portions of the workpiece and adjusting a power of the laser light source according to the areas of the processed portions.

32. An ink injecting member manufactured by the steps of:

irradiating a laser light from a laser light source and separating the laser light into a plurality of parallel laser beams;

irradiating the laser beams to the ink injecting member through a mask arranged in front of the ink injecting member, the ink injecting member being slantingly supported by a supporting member so that central axes of ink passages formed on the ink injecting member cross optical axes of the laser beams;

adjusting a position of the ink injecting member by measuring a position of the predetermined ink passages of the ink passages; and making holes into the ink injecting member by irradiating the laser beams on the ink injecting member through the mask.

* * * * *

UNITED STATES PATENT AND TRADEMARK OFFICE
CERTIFICATE OF CORRECTION

PATENT NO. : 5,389,954
DATED : February 14, 1994
INVENTOR(S) : Inaba et al.

It is certified that error appears in the above-indentified patent and that said Letters Patent is hereby corrected as shown below:

<u>COLUMN 1</u>:

Line 11, "workpiece" should read --workpiece,--.

<u>COLUMN 16</u>:

Line 49, " "0" " should read --"0",--.
Line 55, "(i+2,j-2)="1"." should read --(i+2, j-2)="1".--.

<u>COLUMN 18</u>:

Line 13, "By" should read --$\theta$y--.

Signed and Sealed this

Eleventh Day of July, 1995

Attest:

BRUCE LEHMAN

Attesting Officer     Commissioner of Patents and Trademarks